US012583174B2

(12) United States Patent
Kaynak et al.

(10) Patent No.: US 12,583,174 B2
(45) Date of Patent: Mar. 24, 2026

(54) THERMOSETTING MATERIAL FOR USE IN ADDITIVE MANUFACTURING

(71) Applicant: TIGER COATINGS GMBH & CO. KG, Wels (AT)

(72) Inventors: Baris Kaynak, Wels (AT); Patrick Kuballa, Wels (AT); Gerhard Buchinger, Wels (AT)

(73) Assignee: TIGER COATINGS GMBH & CO. KG, Wels (AT)

( * ) Notice: Subject to any disclaimer, the term of this patent is extended or adjusted under 35 U.S.C. 154(b) by 544 days.

(21) Appl. No.: 17/922,735

(22) PCT Filed: May 12, 2021

(86) PCT No.: PCT/EP2021/062737
§ 371 (c)(1),
(2) Date: Nov. 1, 2022

(87) PCT Pub. No.: WO2021/229006
PCT Pub. Date: Nov. 18, 2021

(65) Prior Publication Data
US 2023/0158737 A1      May 25, 2023

(30) Foreign Application Priority Data

May 12, 2020   (EP) .................................... 20174085
Aug. 10, 2020   (EP) .................................... 20190218

(51) Int. Cl.
B29C 64/153      (2017.01)
B29C 64/10      (2017.01)
(Continued)

(52) U.S. Cl.
CPC ............ B29C 64/153 (2017.08); B29C 64/10 (2017.08); B29C 64/171 (2017.08);
(Continued)

(58) Field of Classification Search
CPC ..... B29C 64/153; B29C 64/10; B29C 64/171; B29C 64/268
See application file for complete search history.

(56) References Cited

U.S. PATENT DOCUMENTS

2005/0005437 A1*   1/2005   Nakamura ........... H05K 3/4661
                                                                           156/239
2006/0071359 A1    4/2006   Monsheimer et al.
(Continued)

FOREIGN PATENT DOCUMENTS

EP            3632941         4/2020
WO      WO-2007/048819         5/2007
(Continued)

OTHER PUBLICATIONS

Jisova, "Curing Mechanism of Epoxides by Imidazoles", Journal of Applied Polymer Science, vol. 34, No. 7, Nov. 20, 1987, pp. 2547-2558.
(Continued)

*Primary Examiner* — Nahida Sultana
(74) *Attorney, Agent, or Firm* — NIXON PEABODY LLP; Jeffrey L. Costellia

(57) ABSTRACT

The present invention relates to a thermosetting material for use in additive manufacturing, the material comprising at least one thermosetting resin and at least two curing compounds different from said thermosetting resin that are able to cure this/these thermosetting resin(s), wherein at least one curing compound is provided for curing during the additive manufacturing process and at least one curing compound is provided for curing during a post-curing step. The invention furthermore relates to a method of producing a cured 3D thermoset object comprising at least the steps of subjecting the material according to the present invention to an additive manufacturing process, obtaining a partially cured 3D thermoset object and subsequently subjecting the partially cured (Continued)

3D thermoset object to a post-curing process to further cure the 3D thermoset object Additionally, the invention relates to the use of the material in an SLS, FFF, CBAM, FGF or powder bed additive manufacturing process.

12 Claims, 6 Drawing Sheets

(51) Int. Cl.

| | |
|---|---|
| *B29C 64/171* | (2017.01) |
| *B29C 64/268* | (2017.01) |
| *B29K 63/00* | (2006.01) |
| *B29K 67/00* | (2006.01) |
| *B29K 101/10* | (2006.01) |
| *B29K 105/00* | (2006.01) |
| *B33Y 10/00* | (2015.01) |
| *B33Y 30/00* | (2015.01) |
| *B33Y 70/00* | (2020.01) |
| *B33Y 70/10* | (2020.01) |
| *B33Y 80/00* | (2015.01) |
| *C08G 59/20* | (2006.01) |
| *C08G 59/40* | (2006.01) |
| *C08G 59/42* | (2006.01) |
| *C08G 63/00* | (2006.01) |
| *C08J 3/12* | (2006.01) |
| *C08J 3/24* | (2006.01) |
| *C08J 3/28* | (2006.01) |

(52) U.S. Cl.

CPC ............ *B29C 64/268* (2017.08); *B33Y 70/00* (2014.12); *C08G 59/20* (2013.01); *C08G 59/4014* (2013.01); *C08G 59/4276* (2013.01); *C08G 63/00* (2013.01); *C08J 3/12* (2013.01); *C08J 3/243* (2013.01); *C08J 3/247* (2013.01); *C08J 3/28* (2013.01); *B29K 2063/00* (2013.01); *B29K 2067/00* (2013.01); *B29K 2101/10* (2013.01); *B29K 2105/251* (2013.01); *B33Y 10/00* (2014.12); *B33Y 30/00* (2014.12); *B33Y 70/10* (2020.01); *B33Y 80/00* (2014.12); *C08G 2650/20* (2013.01); *C08J 2300/24* (2013.01); *C08J 2363/00* (2013.01); *C08J 2367/00* (2013.01)

(56) References Cited

U.S. PATENT DOCUMENTS

| | | | |
|---|---|---|---|
| 2014/0121327 A1 | 5/2014 | Schmidt et al. | |
| 2015/0367418 A1* | 12/2015 | Buller ................ | B28B 17/0072 |
| | | | 425/166 |
| 2016/0151982 A1* | 6/2016 | Sand .................. | B29C 35/0805 |
| | | | 264/308 |
| 2016/0369040 A1 | 12/2016 | Das et al. | |
| 2021/0047490 A1* | 2/2021 | Compton ............... | C04B 26/14 |
| 2021/0269361 A1* | 9/2021 | O'Brien ............. | C08F 222/102 |

FOREIGN PATENT DOCUMENTS

| | | |
|---|---|---|
| WO | WO-2016/168629 | 10/2016 |
| WO | WO-2018/167065 | 9/2018 |
| WO | WO-2018/167067 | 9/2018 |

OTHER PUBLICATIONS

Extended European Search Report for Application No. 20174085.9, mailed Oct. 9, 2020, (7 pages).

Extended European Search Report for Application No. 20190218.6, mailed Feb. 11, 2021, (10 pages).

\* cited by examiner

THERMOSETTING MATERIAL FOR USE IN ADDITIVE MANUFACTURING

TECHNICAL FIELD

The present invention relates to the field of rapid proto-typing, also known as additive manufacturing or 3D print-ing, and is particularly directed to a thermosetting material for use in additive manufacturing (a 3D printing process), which material features excellent storage stability and high reusability of excess material. The present invention further relates to a method of producing cured 3D thermoset objects, 3D thermoset objects made of said material and a use of said material in additive manufacturing. Additionally, the inven-tion relates to the use of the material in selective laser sintering (SLS), fused filament fabrication (FFF), composite based additive manufacturing (CBAM), fused granular fab-rication (FGF) or a powder bed additive manufacturing process.

BACKGROUND

Various 3D printing technologies and processes to obtain polymeric 3D objects exist by now, some of these processes employing exclusively liquid printing materials, such as stereolithography (SLA), hot lithography (HL) or ink jet 3D printing and some others employing exclusively solid print-ing materials, e.g. filaments, such as fused deposition mod-eling (FDM) or fused filament fabrication (FFF), or granu-lar/powdery printing materials, such as selective laser sintering (SLS), selective heat sintering (SHS), fused granu-lar fabrication (FGF) or electrophotographic methods. Fur-ther, there exist mixed processes employing both liquid and granular/powdery printing materials, such as high speed sintering (HSS), binder jetting (BJ), composite based addi-tive manufacturing (CBAM) and multi jet fusion (MJF). Often those latter processes employ a powdery 3D printing material as main matrix material of the 3D object and a liquid, often a kind of ink. Often, the ink is applied via an inkjet head, resulting in the desired resolution and the powder material is provided in form of a so-called powder bed. Typically, the 3D objects are obtained by building the desired object layer by layer, wherein each layer corre-sponds to a cross-section of said 3D object. All of the above-mentioned technologies are suitable to process the materials according to the present invention, however, with-out any limitation to these.

In the past, the solid polymeric 3D printing materials for the above-mentioned processes were almost exclusively chosen from thermoplastic 3D printing materials, most commonly polyamides, in particular polyamide 12 (PA12) accounting by far for the major part of the global market volume. However, thermoplastic 3D objects feature signifi-cant disadvantages, such as poor temperature stability, in particular shrinkage, warping and loss of shape upon heating close to or above its glass transition temperature and/or melting temperature. Further, the stability of these thermo-plastic 3D objects towards chemicals and solvents, in par-ticular towards swelling in solvents, is poor. In addition, thermoplastic materials that are suitable for applications at elevated temperature, such as polyetheretherketones (PEEK), are often economically unfeasible due to its high raw material cost and difficult processing behavior.

Recently, thermosetting 3D printing materials, in particu-lar in powder or granular form, became more prominent and were introduced for certain of the above-mentioned additive manufacturing processes employing powders, filaments or granulates, either exclusively, or in combination with liq-uids, in order to overcome certain disadvantages of thermo-plastic materials. However, the solid thermosetting 3D print-ing materials according to the state of the art still feature significant disadvantages. In particular, the 3D thermoset objects obtained therefrom have low glass transition tem-peratures (Tg), often in between 40 and 75° C., and/or low heat deflection temperatures (HDT), in particular below 70° C. and often even lower, e.g. about 50° C. Also, the storage and transport stability as well as the reusability of excess printing material (e.g. from a powder bed) are usually poor, both of which problems are caused, at least to a certain extent, by uncontrolled reactivity and uncontrolled heat release of exothermic curing reactions of the material.

In the following, a short overview over the relevant state of the art is provided:

WO 2017/046132 A1 relates to the use of a thermosetting polymeric powder composition in a selective laser sintering (SLS) process to produce a 3D duroplast, wherein the composition comprises at least one curable polymeric binder material and wherein during each pass of the SLS process said polymeric binder material is at least partially cured within the layer, thus formed and also at least partially crosslinked with the previous layer. The term "duroplast" is understood as the polymer resulting upon, at least partial, curing of a thermosetting composition; in other words, a thermoset. The polymeric binder material may comprise curable epoxy resins with different kind of crosslinking agents, such as amines or phenolic resins.

Related disclosures may also be found in WO 2018/167067 A1 and WO 2018/167065 A1, which disclose similar compositions. In particular, WO 2018/167067 A1 discloses the use of a thermosetting polymeric composition in a 3D printing process to produce a 3D duroplast, wherein the composition comprises at least one curable polymeric binder material in an amount of up to 95 wt %, preferably up to 98 wt %, of the total composition and at least one thermoplastic having a Tg and/or Mp below the temperature provided in a pass of the printing process in an amount of between 1 and 30 wt % of the total composition and wherein during each pass of the printing process said polymeric binder material is at least partially cured within the layer thus formed and also at least partially crosslinked with the previous layer. Additionally, curing agents may be added to cure the poly-meric binder material. The polymeric binder material may for instance be an epoxy resin that may be cured with an amine curing agent WO 2018/167065 A1 relates to the use of a thermosetting polymeric powder composition in a 3D dry printing process to produce a 3D duroplast object, the composition comprising at least one curable polymeric binder material with free functional groups, wherein during the 3D dry printing process the formed object is only partially cured to a curing degree of below 90%, preferably below 60%, most preferably between 35% and 60%, and the printing process is being followed by a post treatment comprising a heat treatment step to fully cure the printed object into a 3D duroplast object. The use of crosslinking (curing) agents, catalysts and accelerators for curing the thermosetting composition is also disclosed.

EP 3 266 593 A1 relates to a process for the production of three-dimensional structures based on thermosetting materials, the disclosed composition may have at least one crosslinker. A crosslinker is defined to be a mostly low molecular weight chemical compound which has reactive groups, such as epoxy functions, via which the crosslinker reacts with further components of the composition, in par-ticular the reactive components of the composition. Preferably the crosslinker is said to have multiple reactive functions to react with and establish crosslinking between multiple molecules of the reactive component.

Thermoset materials for printing of parts by inkjet 3D printing are disclosed in WO 2020/081791 A1, comprising a photopolymer including one or more thiol monomer, one or more alkene monomer, and a polymerization initiator. WO 2019/025717 A1 discloses a photopolymerisable composition comprising at least one polymerisable resin; one photosensitiser (PS); one annihilator (AN); and one photoinitiator (PI), while EP 0 822 445 A1 is directed to a liquid radiation-curable composition containing liquid components capable of polymerisation by free radicals and also 40-80 wt % liquid di- or polyfunctional epoxide resin(s), 0.1-10 wt % cationic photoinitiator(s), 0.1-10 wt % free radical photoinitiator(s) and no more than 40 wt % of a specific hydroxyl (OH) compound.

EP 3 632 941 A1 discloses resin compositions which can be processed in 3D printing applications at elevated temperatures, in which the resin composition is heated and subsequently subjected to a layer-by-layer, light-induced build-up step, in which a light-curable component in the composition is structured by light-curing to obtain three dimensional objects via a lithography-based additive manufacturing method.

WO 2007/048819 A1 relates to a photocurable composition comprising 35-80% by weight of a cationically curable component, 15-60% by weight of a free radically active component and 0.1-10% by weight of an antimony-free cationic photoinitiator, wherein the percent by weight is based on the total weight of the photocurable composition. The photocurable composition optionally further comprises 0-10% by weight of a free radical photoinitiator and 0-40% by weight of one or more toughening agents, wherein the percent by weight is based on the total weight of the photocurable composition. The document further relates to a process for producing a non-toxic photocurable composition and an antimony-free three-dimensional article.

US 2016/369040 A1 relates to a high performance and high temperature resin composition for three-dimensional printing formed from a two-stage cure comprising a first stage curable group (Component A) and a second stage curable group cured by thermal/heat cure (Component B). Component A is selected from a photo-curable group, a peroxide curable group, an EB curable group, a cationic curable group, an IR curable group, an addition cure group, a condensation reactive group, and/or a chemical additive curable group. Component A further comprises a second reactive group. Component B is selected from a cyanate ester, bismaleimide (BMI), benzoxazine, polyimide, phthalonitrile resin (PN), bismaleimide triazine (BT), silicone resin, epoxy, cyanate epoxy and mixtures thereof.

In addition, there are thermoplastic powder systems which do not require a curing agent, wherein only by melting and cooling 3D parts are produced. Examples for such systems are disclosed in EP 2 708 348 A1, EP 2 272 899 B1 and CN 104647764 B.

A disclosure of thermoplastic material for Fused Deposition Modeling (FDM) technology can be found in US 2015/0145168 A1, EP 3 352 971 A1 and US 2015/0251353 A1. Generally, it can be said that the curing systems used for the existing thermosetting materials (at room temperature in solid state) react completely at a certain temperature within a reasonable period of time (e.g. within 1 h or 2 h).

Further related disclosures may also be found in:

Václava Jíšová: "Curing mechanism of epoxides by imidazoles", JOURNAL OF APPLIED POLYMER SCIENCE, vol. 34, no. 7, 20 Nov. 1987 (1987-11-20), pages 2547-2558, XP055770670, US, ISSN: 0021-8995, DOI:10.1002/app.1987.070340718.

Thus, there is a need for thermosetting materials that may be processed by an additive manufacturing process resulting in 3D thermoset objects with improved properties, in particular high-temperature resistance and excellent chemical stability featuring low shrinkage (<1%) during the additive manufacturing process and a possible post-curing step. Also, there is a need for a material with improved reusability of excess printing material and storage stability. The problem underlying the present invention is thus to provide a thermosetting material that is suitable to be processed via an additive manufacturing process for the production of 3D thermoset objects with improved storage stability, improved dimensional stability after the 3D printing process, improved reusability of excessive material in the 3D printer, as well as improved mechanical, thermal and/or thermomechanical properties. Further, the following properties of the obtainable 3D thermoset objects are desirable, such that the 3D thermoset objects may be widely used for different industrial applications:

good chemical stability, in particular towards acidic or basic media and towards swelling in organic and/or aqueous solvents, good electrical insulation properties, in particular relating to dielectric strength, good to excellent flame retardancy up to class UL94 V0, and suitable mechanical properties for various applications, in particular a tensile modulus of greater than 2 GPa and/or a stress at break of greater than 20 MPa and/or heat deflection temperatures (HDT-A) greater than 80° C.

The object of the present invention is therefore to solve or at least improve the problem of the state-of-the-art and to provide a thermosetting material for the production of 3D thermoset objects, which material has an improved storage stability, results in 3D thermoset objects with improved dimensional stability after the 3D printing process, the material also having improved reusability of non-printed, excessive material in the 3D printer.

BRIEF DESCRIPTION OF THE INVENTION

It has now surprisingly been found that the above objects, properties and needs can be fulfilled or at least be improved by a thermosetting material for use in additive manufacturing, the material comprising at least one thermosetting resin and at least two curing compounds different from said thermosetting resin, which curing compounds are able to cure this/these thermosetting resin(s), wherein at least one curing compound is provided for curing during the additive manufacturing process and at least one curing compound is provided for curing during a post-curing step, which preferably is or comprises a heating step. Said curing compounds are significantly reactive at different amounts of employed energy (e.g. employed heat and thus at different temperatures); i.e. they have different activation energy ($E_A$) for the respective curing reaction (i.e. the energy that must be introduced into the system to enable a chemical reaction, in the present case the curing reaction) and consequently different reaction rates at a definite temperature. Speaking in terms of chemical kinetics, a system with only two curing compounds C1 and C2 and one thermosetting resin that is reactive with C1 and C2 results in two competing reactions according to $2^{nd}$ order kinetics. In case C1 is provided for the additive manufacturing process and C2 is provided for the post-curing step, the Arrhenius equation ($k=A*\exp(-E_A/RT)$) can be used to approximate the reaction rates ($k_x$; x=1 or 2) by assuming an identical and temperature independent pre-exponential factor (A) for both curing reactions. The following holds true as a direct result of the Arrhenius equation: $k_1 > k_2$ at definite temperature (T) for $E_{A1} < E_{A2}$; R denotes the universal gas constant. Thus, the curing compound provided for curing the thermosetting resin during the additive manufacturing process will need a lower amount of activation energy (=lower kinetic barrier) for the curing reaction to occur at a significant reaction rate; in other words, this curing reaction will be kinetically faster. The latter one, i.e. the curing compound provided for curing the respective thermosetting resin during the post-curing step, will generally need a higher amount of activation energy (for instance, heat as provided through increased temperature) for the curing reaction and said reaction is therefore kinetically slower. Thus, the at least one curing compound provided for curing during the additive manufacturing process has a lower activation energy than the at least one curing compound provided for curing during a post-curing step. A person skilled in the art can easily determine from the activation energies of the used curing compounds which one(s) will react already during the additive manufacturing process and which one(s) will need a higher amount of energy to react and thus will react only, or mainly, upon post-cure. Alternatively, the at least one curing compound that is provided for curing during the additive manufacturing process may require a different type of energy for the curing reaction than the at least one curing compound that is provided for curing during a post-curing step. For example, the at least one curing compound provided for curing during the additive manufacturing step may be activated by thermal energy (e.g. heat provided by a laser beam) and the at least one curing compound that is provided for curing during a post-curing step may be activated by radiation (e.g. UV-radiation provided by a UV-lamp). A person skilled in the art can easily determine from the type of energy that is applied in the course of the additive manufacturing step and in the course of a post-curing step, which of the used curing compounds will react already during the additive manufacturing process and which one(s) will need a different type of energy to react and thus will react only upon post-cure.

It is obvious and known that one cannot completely avoid that the curing reaction initiated by the curing compound that is provided for the post-curing step(s) already occurs to a certain extent at lower provided energy (e.g. at lower temperatures), i.e. e.g. during the printing process, but at least such reaction occurs at a lower reaction rate as compared to the curing reaction initiated by the curing compound that is provided for the additive manufacturing process. Also it is noted that even if the temperature is raised during the printing process above a temperature that provides sufficient activation energy for the curing reaction of the respective thermosetting resin by the curing compound that is provided for the post-curing step for a short period of time (e.g. by a laser which may cause the material of a printed layer to selectively heat up to above 150° C. or even above 200° C. for a very short period of time), this curing compound will still react slower as compared to the curing compound that is provided for the respective thermosetting resin to be cured during the additive manufacturing process, because of the higher activation energy. It is, however, essential that as little as possible and in particular no complete curing of the respective thermosetting resins by the curing compound(s) that is/are provided for the post curing step occurs during the additive manufacturing process. In contrast, the curing compound that is provided for the additive manufacturing process may already be completely consumed during the printing process; however, also this curing reaction might be completed during a post-curing step.

Keeping a significant amount of uncured thermosetting resin within the 3D object after the printing process (or, in other words, obtaining only a partially cured object after the printing process) ensures a dimensionally stable printed object as a result of the partial curing, which can be e.g. taken from the printer, (e.g. from the powder bed) and sand blasted, and thereafter further, in particular fully, cured during a post-curing step and thus finished. Also, such a partially cured object still allows a certain flow of the material in the course of the post curing step, which flow causes improved coalescence of the individual layers and thus improved isotropy of the properties of the obtained objects. The partial curing during the additive manufacturing process, however, still provides sufficient dimensional stability to avoid loss of shape of the object in the course of the post-curing step. Apart from the above technical benefit, another important advantage may be achieved: As curing reactions are typically exothermic reactions, heat is being generated. The generated heat may, if uncontrolled, have adverse effects, such as decreased dimensional accuracy of the printed objects due to thermal bleeding and increased ageing (due to pre-reactions and/or agglutination) of non-printed excess material, which reduces or even precludes its reusability. The above adverse effects occur, at least to a certain extent, due to the dissipation and thus distribution of the generated heat of the exothermic curing reaction within the material. However, the material according to the present invention releases the curing heat only partially during the additive manufacturing process, primarily from the curing compound that is provided for the additive manufacturing process and thus the generated heat can be more easily controlled and the adverse effects are being reduced or may even be completely avoided.

The post-curing step can also be at least partly implemented into the additive manufacturing process and its printing steps and provided after one or a few layer(s) of the 3D object or even the entire object have been printed. When providing the layer(s) of printed material sufficiently thin, also post-curing steps based on radiation (for instance light of different wavelength, in particular UV-radiation or X-rays, or electron beam) can be employed to provide a sufficient amount of activation energy, if the completely printed object shall be post-cured, thermal energy (heat) or electron beams for supplying a sufficient amount of activation energy will be preferred; thermal energy, however, is particularly preferred due to its facile handling and ready availability of thermal curing equipment. Further, such post-curing by thermal energy may further improve the isotropic properties of the 3D objects. However, radiation, in particular UV-radiation or X-rays, may also be used to post-cure a completely printed object as a post-cured shell of the object may thus be obtained, which can be sufficient or even desirable for certain applications.

So, the additive manufacturing process is understood herein as the process which shapes the object and causes, at least partial, curing of the respective thermosetting resin by the curing compound/s that is/are provided for the additive manufacturing process. Contrary, a post-curing step is understood herein as a further step, which again causes curing, in particular of the respective thermosetting resin by the curing compound that is provided for the post-curing step, of the object. Of course, also the curing compound that is provided for the additive manufacturing process may provide for complete curing of the respective thermosetting resin during a post-curing step, in case said curing compound only provided for incomplete curing in the course of the additive manufacturing process. The post-curing step(s) may take place in the same and/or different apparatus as the additive manufacturing step and may employ the same and/or different sources of energy, such as heat, radiation and/or pressure. More than one post-curing step, using the same and/or different sources of energy as the first post-curing step, might be required to fully, or at least highly cure the thermoset object.

According to a particularly preferred embodiment, the thermosetting material for use in additive manufacturing comprises at least one thermosetting resin and at least three curing compounds different from said thermosetting resin able to cure this/these thermosetting resin(s), wherein at least one curing compound is provided for curing during the additive manufacturing process and at least one curing compound is provided for curing during a post-curing step.

DETAILED DESCRIPTION OF THE INVENTION

The objects listed above are achieved by the embodiments as specified within the independent claims. Preferred embodiments are specified in the dependent claims and the description.

In a first aspect of the present invention, the thermosetting material for use in additive manufacturing comprises at least one thermosetting resin and at least two curing compounds different from said thermosetting resin, which curing compounds are able to cure this/these thermosetting resin(s), wherein at least one curing compound is provided for curing during the additive manufacturing process and at least one curing compound is provided for curing during a post-curing step. Thus, said curing compounds have an activation energy (i.e. the energy that must be introduced into a system to enable a chemical reaction at a significant reaction rate) sufficiently different from one another to ensure different reaction rates at a defined temperature.

The present invention enables the production of a thermosetting material for additive manufacturing with very good storage stability. In connection therewith, the ratio of the curing compounds to each other can also be preferably selected so that complete curing does not take place during additive manufacturing, but only when a post-curing step of the objects, usually after the additive manufacturing process, has been completed. The combination of two or more curing compounds, at least one of which is a curing compound for the post-curing step, enables the additive manufacturing of thermoset objects with improved dimensional stability after the printing process and improved reuse of the material left behind after the printing process. Also, the generated heat of exothermic curing reactions may be better controlled, resulting in reduced thermal bleeding and reduced ageing of excess material and thus improves the reusability of excess material. Furthermore, the material according to the present invention enables, depending on the thermosetting resin(s) used, enhanced 3D printing of epoxy resins, polyester resins and other resin systems with improved layer interaction and inter-layer adhesion and thus additive manufacturing of objects with improved isotropic mechanical and thermomechanical properties, improved dimensional stability and/or with a shrinkage rate of below 1%.

[Thermosetting resin] As outlined above, the thermosetting material according to the present invention comprises at least one thermosetting resin. This/These thermosetting resin(s) is/are selected particularly from the groups of epoxy resins, in particular bisphenol-based epoxy resins, phenolic epoxy resins or epoxy novolac resins, or polyester resins, in particular carboxy functional polyester resins, but can also be selected from the groups of phenolic resins, acrylic resin, vinyl ether resins, unsaturated resins, in particular unsaturated polyester resins, polyamide resins, polyimide resins, amine resins, fluorinated resins, in particular fluoroethylene vinyl ether (FEVE) resins, bismaleimide resins, polycyclic aromatic resins, in particular naphthalene resins, elastomermodified resins, as well as from copolymers and mixtures of said thermosetting resins and further thermosetting resins as known in the art. Epoxy resins, in particular bisphenol-based epoxy resins, phenolic epoxy resins or epoxy novolac resins, are particularly preferred, because high glass transition temperatures and/or HDT-A values of above 100° C. may be achieved for the printed and post-cured thermoset objects. The epoxy resin used as thermosetting resin can of course also be a mixture of different epoxy resins. In certain other embodiments, polyester resins, in particular carboxy functional polyester resins are particularly preferred. Yet again, in certain embodiments, a mixture of at least one polyester resin, preferably carboxyl functional polyester resin, and at least one epoxy resin, preferably bisphenol-based epoxy resins, phenolic epoxy resins or epoxy novolac resins, is employed. Preferably, the thermosetting resin(s) account(s) for at least 20 wt %, preferably at least 30 wt %, more preferably at least 40 wt %, even more preferably at least 50 wt % and most preferably at least 55 wt %, e.g. 60 wt % or 65 wt % of the material according to the present invention. Yet preferably, the thermosetting resin(s) account(s) for 30-80 wt %, preferably 40-70 wt %, more preferably 45-65 wt %, e.g. 62 wt % of the material.

Suitable commercially available compounds that may exemplary be employed as thermosetting resin, alone or in combination, are D.E.R. 6225 HT (DOW Chemical Company, US), softening point=87-95° C., EEW=650-725 g/eq, viscosity=0.8-1.6 Pas (150° C.); D.E.R. 642U-20 (DOW Chemical Company), softening point=89-97° C., EEW=500-560 g/eq, viscosity=1.9-3.3 Pas (150° C.); D.E.R. 6510 HT (DOW Chemical Company), EEW=400-450 g/eq, viscosity=7.5-9.5 Pas (150° C.); Kukdo KD-213 (Kukdo Chemical Co, Ltd., South Korea), softening point=88-98° C., EEW=730-840 g/eq, viscosity=3.5-7.0 Pas (150° C.) Araldite GT6064 (Huntsman Corporation, US), softening point=96-101° C., EEW=730-780 g/eq, viscosity=0.5-0.7 Pas (175° C.).

According to a preferred embodiment of the material according to the present invention, it comprises at least two thermosetting resins. This is especially advantageous in that the two thermosetting resins can have different characteristics; with one system (resin plus curing compound), curing during the additive manufacturing process and with the other system (resin plus curing compound), curing only during the post-curing step may be achieved. Further, the properties of the objects and of the material may be varied by use of at least two thermosetting resins without changing the main matrix material of the object; for example, one of the thermosetting resins may be employed as main matrix material of the object (e.g. an epoxy resin such as a bisphenol-based epoxy resin) and a second thermosetting resin may be varied to alter certain properties of the material and/or the object in order to adapt the material for a respective printing process and/or the properties of the obtained objects to a specific application. Exemplary, a (semi)-crystalline polymer, such as (semi)-crystalline polyester, polyether or epoxy resin, may be employed as second thermosetting resin, which may reduce the viscosity of the material above the melting temperature of its crystalline domains. As another example, a fluoroethylene vinyl ether (FEVE) resin may be employed as second thermosetting resin, which may improve the weathering resistance of the object.

[Curing compound] During the curing reaction initiated during the printing step, a partially cured thermoset object is formed. The curing compounds are chosen such that an at least first curing (crosslinking) occurs in the course of the 3D printing (additive manufacturing) process, followed by an at least second curing (crosslinking) during the post-curing step. Typically, both curing reactions are induced by the input of a certain amount of energy, such as heat, radiation and/or pressure, wherein heat and/or radiation curing is particularly preferred. In case of heat curing, temperatures of 70-400° C., preferably 80-300° C., more preferably 80-220° C., are often employed. In case of radiation curing, visible (VIS)/ultra-violet (UV) radiation is most often used. Also X-ray and electron beam (EB) radiation may be used. In a particular preferred embodiment, all employed curing compounds are thermally curable. The curing compounds preferably account for at least 0.1 wt %, more preferably at least 1 wt % and even more preferably at least 3 wt %, e.g. 4 or 6 wt % of the material. Preferably, the curing compounds account for 0.1-15 wt %, preferably 0.1-10 wt %, more preferably 0.5-7 wt % and most preferably 1-6 wt % of the material, e.g. 5 wt %. Also, it is preferred if the weight ratio of the curing compound that is provided for the post-curing step to the curing compound that is provided for the additive manufacturing process is greater than 1:1, preferably greater than 1.5:1 and more preferably greater than 2:1 and yet even more preferably greater than 3:1. Also, it is preferred if the ratio of the reactive groups of the curing compound that is provided for the post-curing step to the reactive groups of the curing compound that is provided for the additive manufacturing process is greater than 1:1, preferably greater than 1.5:1 and more preferably greater than 2:1 and yet even more preferably greater than 3:1. So, according to a preferred embodiment of the present invention, the curing compound provided for curing during the additive manufacturing process is present in the material in a sub-stoichiometric amount with regard to the reactive groups present in the thermosetting material. Of course, said reactive groups are to be understood as those reactive (functional) groups that are capable of reacting with said curing compound. Consequently, it is possible to use one and the same thermosetting resin or different thermosetting resins with the same reactive groups for building up the matrix of the dimensionally stable 3D object but still allowing sufficient reactive groups for the post-curing step to finish the 3D object.

Furthermore, it is preferred if the or at least one of the curing compound(s) provided for curing in a post-curing step has an activation temperature above the temperature used in the additive manufacturing process. An activation temperature above the temperature used in the additive manufacturing process makes sure that the curing compound(s) is/are not activated during the additive manufacturing process (printing step) but remain available for the post-curing step. As will be explained in more detail below, activation temperature means the temperature at which the system has enough energy to start the curing (cross-linking) reaction to a significant extent, which reaction is exothermic.

If the activation temperature of the curing compound is above the temperature used in the additive manufacturing process, this curing compound will not or only to a negligible extent initiate any curing in the additive manufacturing step. In connection with the present invention, the term "activation temperature" for a thermally curable curing compound is determined as the onset of the exothermic peak of the curing reaction in a DSC measurement of the thermosetting resin with a heating rate of 20° C./min. The activation temperature for the respective curing compound can be determined as described in the methods part of this application. This procedure may then be repeated for each curing compound of a material. Apart from DSC, other measurement methods may be suitable for certain materials to determine the activation temperature(s) of the curing compound(s), which allow the measurement of reaction kinetics and/or exothermic reactions.

According to a further preferred embodiment of the material according to the present invention, at least one of the curing compounds provided for curing during the additive manufacturing process has an activation temperature of above 80° C., preferably above 90° C. Since the additive manufacturing step will in some cases take place at a temperature of between 60 and 80° C. (e.g. regarding the powder bed temperature), which is usually slightly below or slightly above the glass transition temperature of the material, an activation temperature of above 80° C. makes sure that there is none or only very little curing initiated by this curing compound during the additive manufacturing process without additional input of energy (e.g. by a laser beam). Thus, such a curing compound does not or only to a negligible extent pre-react upon storage or transport at typical storage/transport temperatures (e.g. 0-50° C.) and upon the additive manufacturing process (e.g. within the powder bed or in overflow containers), unless further energy is employed (e.g. by a laser beam). Consequently, the excess material may be reused, either in pure form or as a mixture with fresh material, without significant loss of performance. Such curing compound is intended for the curing during the additive manufacturing process in which temperatures of above 80° C. will only be reached at a printed cross-section of the object. The small, local energy input (e.g. heating) during the additive manufacturing process is sufficient to activate this curing compound provided for the buildup of the 3D object, which curing compound initiates the quicker first curing reaction but will not be sufficient to significantly activate the curing compound intended for the post-curing step, or to activate this curing compound to a significant extent.

According to a further preferred embodiment of the material according to the present invention, at least one of the curing compounds provided for curing during the additive manufacturing process has an activation temperature of above 60° C., preferably above 70° C.

According to another preferred embodiment of the material according to the present invention, at least one of the curing compounds has an activation temperature of above 100° C. Such compound may be provided for either the additive manufacturing process or the post-curing step, depending on the conditions of the additive manufacturing process. In many cases, however, such compound will be provided for the additive manufacturing process. In case sufficient energy is provided within a formed layer (cross-section) of the object, such curing compound will react, at least to a certain extent, already in the course of the additive manufacturing process. However, it may be that such compound reacts only in a post-curing step if the additive manufacturing process is performed with low energy input (e.g. low laser power).

Turning now to differences between the at least two curing compounds provided by the present invention, according to a preferred embodiment of the material, the difference regarding activation temperature of at least two curing compounds is at least 10° C., preferably at least 20° C., and more preferably at least 30° C., yet more preferably at least 40° C., even more preferably at least 50° C. and most preferably at least 60° C. Depending on the temperatures/energy levels used during the printing process and the post curing step, specific curing compounds with their specific activation temperature may be chosen. The temperature difference ensures that one curing reaction substantially takes place during object buildup (additive manufacturing/printing process), while the curing reaction initiated by the second curing compound will not start at the lower temperature, at least not to in a substantial percentage.

According to another preferred embodiment of the present invention, at least one curing compound has an activation temperature of between 70 and 130° C. and at least one curing compound has an activation temperature of greater than 130° C., in particular greater than 150° C., preferably greater than 170° C.

According to another preferred embodiment of the present invention, at least one curing compound has an activation temperature of between 60 and 100° C. and at least one curing compound has an activation temperature of greater than 100° C., in particular greater than 120° C., preferably greater than 140° C.

According to another preferred embodiment of the present invention, at least one curing compound has an activation temperature of between 60 and 120° C. and at least one curing compound has an activation temperature of greater than 120° C., in particular greater than 140° C., preferably greater than 160° C.

According to another preferred embodiment of the present invention, at least one curing compound has an activation temperature of between 70 and 150° C., preferably between 100 and 150° C. and at least one curing compound has an activation temperature of greater than 150° C., in particular greater than 160° C., preferably greater than 170° C.

According to another preferred embodiment of the present invention, at least one curing compound has an activation temperature of between 100 and 170° C., preferably between 120 and 150° C. and at least one curing compound has an activation temperature of greater than 170° C., in particular greater than 180° C., preferably greater than 200° C.

It is also preferred if at least one curing compound causes an exothermic curing peak below 150° C. (peak temperature), preferably below 160° C., and at least one curing compound causes an exothermic curing peak above 150° C. (peak temperature), preferably above 160° C., as measured by DSC of the material at a heating rate of 20° C./min.

It is also preferred if at least one curing compound causes an exothermic curing peak (peak temperature) below 170° C., more preferably below 160° C. yet more preferably below 150° C., and at least one curing compound causes an exothermic curing peak above 170° C. (peak temperature), preferably above 180° C., more preferably above 190° C. and most preferably above 200° C., as measured by DSC of the material at a heating rate of 20° C./min.

It is also preferred if at least one curing compound causes an exothermic curing peak (peak temperature) below 150° C., more preferably below 140° C., yet more preferably below 130° C. and most preferably below 120° C. and at least one curing compound causes an exothermic curing peak above 150° C. (peak temperature), preferably above 160° C., more preferably above 170° C. and yet more preferably above 180° C. and most preferably above 200° C., as measured by DSC of the material at a heating rate of 20° C./min.

It is also preferred if at least one curing compound causes an exothermic curing peak below 150° C. (peak temperature), preferably below 140° C., more preferably below 130° C. and most preferably below 120° C. and at least one curing compound causes an exothermic curing peak above 150° C. (peak temperature), preferably above 160° C., more preferably above 170° C., even more preferably above 180° C. and most preferably above 20° C. as measured by at least two individual DSC measurements of at least two model materials consisting only of one thermosetting resin and one respective curing compound at a heating rate of 20° C./min. The method is described in more detail in the methods part of the subject application.

It is also preferred if at least one curing compound causes an exothermic curing peak below 170° C. (peak temperature), preferably below 160° C., more preferably below 150° C. and most preferably below 140° C. and at least one curing compound causes an exothermic curing peak above 170° C. (peak temperature), preferably above 180° C., more preferably above 190° C., even more preferably above 200° C. and most preferably above 220° C. as measured by at least two individual DSC measurements of at least two model materials consisting only of one thermosetting resin and one respective curing compound at a heating rate of 20° C./min. The method is described in more detail in the methods part of the subject application.

According to another preferred embodiment, the material comprises at least three curing compounds, preferably three, four or five curing compounds. In such embodiments, all other embodiments that concerning at least two curing compounds may analogously be employed, wherein the third and if applicable fourth, fifth etc. curing compound may each either be provided for curing during the additive manufacturing step or for curing during a post-curing step.

Accordingly, another preferred embodiment of the present invention provides that the material comprises at least a third curing compound having a temperature difference regarding activation temperature from the first curing compound of at least 20° C., preferably at least 40° C., more preferably at least 60° C., yet more preferably at least 80° C. and most preferably at least 100° C. As explained above, different activation temperatures of the curing compounds can provide for distinguished and separate curing reactions within the material once an activation temperature is reached. Non-activated curing compounds remain available, at least to a large extent, for suitable cross-linking reactions in further steps.

A further preferred material according to the present invention is characterized in that it comprises at least one curing compound having an activation temperature of above 70° C., preferably above 80° C., at least one curing compound having an activation temperature of above 100° C., preferably above 110° C. and at least one curing compound having an activation temperature of above 140° C., preferably above 150° C., more preferably above 170° C. and most preferably above 190° C. With such a material, for instance, two different curing compounds can be provided for curing during the additive manufacturing process and another curing compound for curing during the post-curing step or, alternatively and depending on the temperature that is used, one curing compound for curing during the additive manufacturing process and two curing compounds for the post-curing, which may cause different curing reactions at different temperatures during the post-curing step.

As already mentioned, it is clear to a person skilled in the art that also the curing reaction intended for the post-curing step of the then dimensionally stable 3D object will to some extent most likely already start during the printing (additive manufacturing) process, but will during this printing step be in competition with the kinetically faster curing reaction started/initiated by the curing compound provided for curing during the additive manufacturing process. Once this faster curing reaction has occurred to a substantial extent, the 3D printed object will be provided with sufficient dimensional stability to be e.g. taken from the powder bed, (sand) blasted and freed from superfluous material, and ready to then undergo the second curing reaction started/initiated by the curing compound provided for curing during the post-curing step. In order to do so, the post-curing step is for instance carried out by raising the temperature of the object in order to activate the second curing compound. Alternatively, the post-curing step can also be carried out by activating the second curing compound, for instance by radiation or an electron beam, in case the second curing compound is accordingly chosen for such form of activation.

Thus, according to a preferred embodiment of the present invention, in the thermosetting material at least one curing compound is provided for curing in a post-curing step by radiation. This has the advantage that, in case the curing compound that is provided for the additive manufacturing process provides for thermal curing of the respective thermosetting resin, that the two curing reactions may be completely separated, as the curing reaction of the post-curing step may not be initiated at all by thermal energy. This may for example be achieved by providing an unsaturated thermosetting resin (e.g. comprising carbon-carbon double bonds in the polymeric backbones or side chains comprising vinyl and/or allyl groups) that additionally comprises reactive groups for polycondensation and/or polyaddition reactions such as epoxy-, hydroxyl-, carboxyl- and amine-groups, which may be thermally initiated. The reactive groups for the polycondensation and/or polyaddition reaction may be cured by one curing compound that is provided for the additive manufacturing step. In contrast, said unsaturations are not or at least not significantly reactive during a heat treatment, but may be cured by means of a compound that is provided for the post-curing step by radiation in the course of a post treatment step or via EB curing.

Alternatively, according to another preferred embodiment of the present invention, at least one curing compound is provided for a thermal post-curing step. In such embodiments, the object may be fully, or at least highly, cured with only one post-curing step, in case the curing compound that is provided for the additive manufacturing process provides for thermal curing of the respective thermosetting resin. As the curing compound that is provided for the additive manufacturing process may only have partially reacted in the course of the additive manufacturing process, also curing of this compound can be completed in the course of a thermal post-curing step that is employed for the curing reaction of the curing compound with its respective thermosetting resin that is provided for the post-curing step.

In certain cases, it may also be beneficial if the material according to the present invention comprises at least three curing compounds. In such embodiments, the generation of the reaction heat caused by exothermic curing reactions may be even better distributed over a broader temperature range. Additionally, one curing compound with the lowest activation temperature (e.g. 80° C.) may be present in smaller amounts if another curing compound with a slightly higher activation temperature (e.g. 105° C.) is also added. The third curing compound may have a significantly higher activation temperature (e.g. 170° C.). In such embodiments, the first and second curing compounds are typically provided for curing the respective resin(s) in the additive manufacturing process and the third curing compound is provided for the post curing step. By addition of the second curing compound, which is still reactive enough to react, at least partially, in the course of the additive manufacturing process with the respective thermosetting resin(s), sufficient dimensional stability of the objects can be achieved, while the storage stability and reusability of the material is improved as compared to embodiments comprising only the first curing compound in higher amounts. Nevertheless, small amounts of the highly reactive first curing compound may be highly beneficial as this will to a large extent, or even completely, react with the respective thermosetting resin(s) in the course of the additive manufacturing process.

For the subject of the present invention, reference to the term "curing compound" is intended to include curing compounds as such, crosslinking compounds (compounds having on average at least 2 reactive groups per molecules), catalysts, initiators et cetera, in short, any type of compound which is able to initiate a curing (cross-linking) of the chosen thermosetting resin(s). Preferably, materials according to the present invention comprise at least one crosslinking compound, more preferably at least two crosslinking compounds. The curing compounds can be selected from the groups of amines, in particular aliphatic amine compounds and/or aromatic amine compounds and/or blocked amine compounds; amide-functional compounds, in particular cyanamide-based compounds, preferably dicyandiamide-based compounds and/or hydroxylalkyl amides; acids and acid-anhydrides, in particular carboxylic acids and the respective anhydrides; polyamides; epoxy resins; phenolic resins; polymercaptans; isocyanates, in particular blocked isocyanates; uretdiones; latent curing agents, in particular onium salts—such as sulfonium salts—aromatic biguanides, quaternary ammonium borates, (triphenylphosphine-methylene) boranes, boron trifluoride-amine complexes and organic-acid hydrazides; and so forth. The choice of curing compounds of course also depends on the chemical nature of the thermosetting resin(s).

According to a preferred embodiment, the curing compounds can be selected from the groups of amines, in particular aliphatic amines and/or blocked amines and/or aromatic amines, in particular heterocyclic amines and/or imidazole-based compounds; amide-functional compounds, in particular cyanamide-based compounds, preferably dicyandiamide-based compounds, hydroxylalkyl amides; phenolic resins; epoxy resins; urea-based compounds; isocyanates, in particular blocked isocyanates and uretdiones.

According to a further preferred embodiment, the curing compound(s) which are provided for curing during the additive manufacturing process can be selected from the groups of amines, in particular aliphatic amines and/or blocked amines and/or aromatic amines; The curing compounds(s) which are provided for curing during a post-curing step can be selected from the groups of epoxy resins; amines, in particular aromatic amines, preferably heterocyclic amines and/or imidazole-based compounds; amide-functional compounds, in particular cyanamide-based compounds, preferably dicyandiamide-based compounds; hydroxylalkyl amides; urea-based compounds; isocyanates, in particular blocked isocyanate and uretdiones.

According to a particularly preferred embodiment, the material comprises at least three, four or five curing compounds. The third, fourth and fifth curing compound can be independently selected from the group of epoxy resins; amines, in particular aromatic amines, preferably heterocyclic amines and/or imidazole-based compounds; amide-functional compounds, in particular cyanamide-based compounds, preferably dicyandiamide-based compounds; hydroxylalkyl amide; urea-based compounds; isocyanates, in particular blocked isocyanate and uretdiones. According to the present invention, the curing compounds used can also have the same chemical structure, but still require different levels of energy for activation of the curing reaction. A partial curing of the material according to the present invention during the additive manufacturing process can be ensured by for instance applying a micro-encapsulation to a specific curing compound or at least partially blocking functional groups of the curing compound, or by similar methods that serve to raise the amount of energy required to activate the functional groups of the curing compound to a level that is not, or at least not completely, obtained in the additive manufacturing process, but only during a post-curing step. In doing so, one and the same chemical structure has to be looked at as representing two different curing compounds with the unblocked or un-encapsulated functional groups acting as curing compound during the additive manufacturing step while the blocked or encapsulated functional groups are set free (unblocked/unencapsulated) during the higher temperatures/radiation used in the post-curing step and thus start the post-curing.

Yet alternatively, the curing compound(s) that is/are provided for curing during the post-curing step may be added to the material in the course and/or after the additive manufacturing process. This may for instance be achieved by a selective deposition method, such as inkjet or electrophotographic printing in the course of which the curing compound is deposited on an already printed cross-section of the object or even prior to the actual printing step, before a further cross-section is being printed. Alternatively, such curing compound may be unselectively deposited on a printed or non-printed layer, for instance via a rippling method or the like, before yet again printing of a further layer. Such embodiments have the advantage that the curing reaction of the curing compound that is provided for the additive manufacturing process has already been initiated/completed before the curing compound(s) for the post-curing step(s) is/are even provided. Consequently, the curing reactions may be entirely separated from each other.

In case of epoxy resins as the thermosetting resin(s), aliphatic amine-functional compounds or aromatic amine functional compound show high reactivity with epoxy groups. Said high reactivity may even be increased by addition of additional curing compounds, in particular suitable catalysts (e.g. Lewis acids or Lewis bases) to the material. Typically, aliphatic amine curing compounds have a slightly higher reactivity than aromatic amine curing compounds, which is caused by the higher nucleophilicity of the aliphatic amine group as compared to aromatic amine group. This high reactivity of aliphatic amine curing compounds particularly favors the partial curing of the material during the additive manufacturing process, as usually only a short time exposure of the material with the required energy (e.g. by scanning with a laser beam) for the curing reaction is needed. Contrary, aromatic, in particular heterocyclic, amine-based compounds, such as imidazoles and imidazolines, or amide functional compounds, in particular cyanamide such as dicyandiamide-based compounds, or Mannich bases tend to react slower with epoxy groups as compared to the above-mentioned aliphatic amine functional curing compounds. Cyanamides tend to react even slower than aromatic amines. In general, the following holds true for the reactivity: aliphatic amines>aromatic amines>amides. As a result, the substantial curing reaction of these compounds with an epoxy resin of the material will favorably occur during a post-curing step. However, in certain cases, aromatic amines may also already react predominantly during the printing process, as their reactivity is only slightly decreased as compared to aliphatic amines. The latter compounds may also be accelerated by use of suitable catalysts and then be employed as curing compounds for the additive manufacturing process. The following preferred combination of curing compounds may be employed as curing agent:

one or more aliphatic amine(s) and one or more aromatic amine(s) (preferably imidazole-based compounds);

one or more aliphatic amine(s) and one or more amide(s), in particular cyanamide(s) (preferably dicyandiamide based compounds);

one or more aromatic amine(s) (preferably imidazole-based compounds) and one or more amide(s), in particular cyanamide(s) (preferably dicyandiamide based compounds);

one or more aliphatic amine(s), one or more aromatic amine(s) (preferably imidazole-based compounds) and one or more amide(s), in particular, cyanamide(s) (preferably dicyandiamide based compounds).

Among above combinations, a combination of one or more aliphatic amine(s) with one or more amide(s), in particular cyanamide(s), is preferred as curing agent. Of course, catalysts may also be added to each respective combinations of curing compound.

Suitable commercially available compounds that may exemplary be employed as curing compounds are: Aradur 835 (amine functional, Huntsman, US); EPIKURE™ P-104 (accelerated dicyandiamide, Hexion); 2-Ethylimidazol (Donau Chem., Austria); DYHARD® 100S (dicyandiamide, Alz Chem, Germany); CUREZOL 2MZ (SHIKOKU, Japan), imidazole type hardener; CUREZOL 1B2PZ (SHIKOKU), imidazole type hardener; OMICURE DDA 5 (CVC Thermoset Specialities, US), dicyandiamide; OMICURE 33-DDA (CVC Thermoset Specialities), diaminodiphenylsulfone, Eutomer B31 (Whyte Chemicals, UK), Dyhard® UR300 CUREZOL C17Z (SHIKOKU); BENOX® A-75 (United Initiators, Germany); PEROXAN AEC (PERGAN GmbH, Germany); PEROXAN PK295P (PERGAN GmbH) Aradur 9506 (blocked polyamine, Huntsman), Aradur 3086 CH (accelerated phenolic resin, Huntsman), Dyhard 100S (dicyandiamide, AlzChem), Aradur 2844 (dicyanodiamide derivate Huntsman), EPIKURE P-108 (accelerated form of dicyandiamide, Hexion, US), PRIMID SF 4510 (hydroxyalkyl amide, EMS-GRILTECH, Switzerland), Aradur 3123 ES (heterocyclic amine, Huntsman), DYHARD MI-C (2-methyl-1H-imidazole, AlzChem), Omicure U410M (aromatic substituted urea, CVC Thermoset Specialities), Omicure U35M (cycloaliphatic substituted urea, CVC Thermoset Specialities), Omicure U52M (aromatic substituted urea, CVC Thermoset Specialities), Omicure U405M (aromatic substituted urea, CVC Thermoset Specialities).

According to a preferred embodiment, the composition uses a purely thermal curing system. This is to be understood as that the composition can be fully cured with heat energy (e.g.: as provided by a laser beam, a convection oven, IR radiation, or any other source of heat that is capable to heat the composition to the required curing temperature).

According to a further preferred embodiment, the composition uses a non-actinic curing system. This to be understood as that the composition can be fully cured without any actinic radiation, whereas under actinic radiation any electromagnetic radiation having a wavelength equal to or shorter than UV-radiation (e.g.: UV-A, B and C radiation, X-rays, gamma-rays) and high energy particles beams, such as electron beams.

According to a further preferred embodiment, the composition uses a non-cationic curing system. This to be understood as that the curing reaction does not follow a cationic curing mechanism. Such compositions are free of cationic polymerization initiators.

According to a preferred embodiment, the composition is free of photoinitiations. This is to be understood as that the composition is free of compounds that decompose upon treatment with light (e.g.: UV-light) under the formation of reactive species (e.g.: radicals, cations) that initiate the curing reaction.

According to a preferred embodiment, the composition uses a non-radical curing system. This is to be understood as that the composition can be fully cured without the formation of radical-species in the course of the curing reaction.

[Fillers] Various fillers may optionally be employed for the material according to the present invention. As the filler may strongly influence the properties of the material and the obtained thermoset objects therefrom, the choice of the filler strongly depends on the desired application. Of course, the filler may comprise a multitude of different filler compounds. The filler usually accounts for at least 5 wt %, preferably at least 10 wt % and more preferably at least 20 wt %, e.g. 25 or 30 wt % of the material according to the present invention. However, the material may also be free of fillers. Preferably, the filler accounts for 5-60 wt %, preferably 10-50 wt %, more preferably 15-45 wt % and most preferably 20-40 wt % of the material, e.g. 32 wt %. Also, the filler may comprise functional fillers comprising functional groups that are capable of reacting with itself or with any other compounds present in the material, in particular the thermosetting resin(s) and/or the curing compounds.

Organic and/or inorganic fillers may be employed. Also, the filler may comprise a coloring agent, such as pigments and/or dyes, although pigments are preferably used. Further, the filler may comprise a flame-retardant compound, which may significantly improve the flame retardance properties of the 3D thermoset objects. Organo-phosphorus based flame retardants are preferably used. Such flame-retardant compounds are preferably used in an amount of 5-30 wt %, preferably 7-25 wt % and more preferably 9-20 wt % with respect to the total material. By employing such flame retardants, 3D thermoset objects with excellent flame retardance properties, in particular up to class V0 according to UL94, may be obtained. This is particularly desirable for electronic, in particular for insulating, and automotive applications.

Suitable types of fillers that may exemplary be employed, alone or in combination, are: glass fibers, glass beads, hollow glass bubbles, kaolin, talc, zeolite, wollastonite, graphene, calcium carbonate, silicone carbide, carbon, carbon nanotubes, silica, silicates, metal oxides, aluminum oxide, mica, titanium dioxide, carbon fiber, elastomers, thermoplastics, cellulose.

According to a preferred embodiment, the material comprises an inorganic filler, in particular kaolin, talc, titanium dioxide, silica, silica-based compounds, inorganic silicates and/or wollastonite.

Suitable commercially available compounds that may exemplary be employed as filler, alone or in combination, are:

Inorganic fillers: Aktifit AM (Hoffmann Mineral GmbH, Germany) amino-silane functionalized kaolinite, D50=2 μm; Silfit Z 91 (Hoffmann Mineral GmbH), mixture of silica and kaolinite, D50=2 μm; Tremin 283 (Quarzwerke GmbH, Germany), silane functionalized wollastonite, D50=12 μm; Tremin 939 (Quarzwerke GmbH), fiber like wollastonite, D50=23 μm; Microglass 9110 (Fibertec Inc., US), glass fibers, D50=75 μm; Si-Tuff SF-1 (Haydale Ceramic Technologies LLC, US.), deagglomerated silicon carbide microfibers, D50=11 μm; Silatherm 1360 (Quarzwerke GmbH), aluminosilicate, D50=22 μm; Portafill® A40 (Sibelco Europe, Netherlands), aluminum hydroxide, D50=11.5 μm; Portaryte B10 (Sibelco Europe), barite, D50=2.6 μm; Silibeads AIR 8070-77 (Sigmund Lindner GmbH, Germany) Hollow Glass Beads, D50=30 μm; Silibeads SOLID 5210-7 (Sigmund Lindner GmbH) Micro Glass Beads, D50=25 μm.

Organic fillers: Expancel 551 DE 40 (AkzoNobel, Netherlands), thermoplastic microspheres, D50=40 μm; Staphyloid AC 4030 (Danick Specialties & Support, Inc, US), core-shell filler, D50=0.3 μm; Nexylon® (EMS-Group, Switzerland), PA 66 fibre; Nexlene® (EMS-Group) PPS fibre.

Flame retardants: Organic Phosphinates: Exolit® OP1230 (Clariant, Switzerland), Exolit® OP 930 (Clariant), STRUKTOL® Polyphlox® 3710(Schill+Seilacher "Struktol" GmbH, Germany); Organic phosphorous modified epoxy resin: STRUKTOL® Polyphlox® 3735 (Schill+Seilacher "Struktol" GmbH); STRUKTOL® Polyphlox® 3742 (Schill+Seilacher "Struktol" GmbH).

[Additives] Of course, the material according to the present invention may optionally also comprise various kinds of additives as are known in the art, such as flow additives, out-gassing (=degassing) additives, absorbers, synergists, adhesion promoters, light stabilizers, UV stabilizers, inhibitors, anti-caking additives, fluidizing additives, structuring agents, scratch resistance additives, slip additives, dispersing agents, process additives, plasticizers, thixotropic agents, viscosity adjusting agents, thermoplastic compounds and resins, elastomers, and the like.

According to a preferred embodiment, the material comprises a degassing additive, preferably in a concentration range between 0.1 and 3 wt % with respect to the material. Preferably the degassing is or comprises benzoin.

According to a preferred embodiment, the material comprises a fluidizing additive, in particular in case the material is provided for as a powder, preferably in a concentration range between 0.05 and 2 wt % with respect to the material. Preferably the fluidizing additive is or comprises a silica and/or alumina compound. Typically, the fluidizing additive is added to the material after the melt-mixing step, e.g.: before, during and/or after a grinding step.

According to a preferred embodiment, the material comprises a flow additive, preferably in a concentration range of 0.1 and 3 wt % with respect to the total material. Such flow additive may significantly improve the melt flow of the material. Preferably, such flow additive is or comprises an acrylic polymeric compound.

Another preferred embodiment of the present invention is directed to the material being in form of powder, granulate and/or filament. From a practical point of view, solid materials are preferred, although the present invention could also be carried out with liquid materials. In such embodiments, the material preferably features a glass transition temperature of at least 30° C., preferably at least 40° C., more preferably at least 50° C. and even more preferably at least 60° C.

Preferably, a method of producing a cured 3D thermoset object comprises at least the following steps:

a. subjecting the material according to the present invention as described above to an additive manufacturing process;

b. obtaining a partially cured 3D thermoset object; and c. subjecting the partially cured 3D thermoset object to a post-curing process, preferably comprising a heat treatment, to further cure the 3D thermoset object.

As already mentioned above, the post-curing process may also comprise more than one step, in particular more than one heat treatment step at different temperatures, for instance in case two different curing compounds are provided in the material for such a post-curing process. However, it would also be within the scope of the present invention if the material comprises two different curing compounds for the post-curing process, which either need the same or very similar or also a very different activation energy, in which case the post-curing process can take place either at one single temperature above the required temperature for the two curing compounds or can be split into two treatments, one at or above the required temperature for the first curing compound and the other one at or above the required temperature for the second curing compound.

According to a further aspect of the present invention, a use of a material according to the first aspect in an additive manufacturing process, preferably in a selective laser sintering (SLS), fused filament fabrication (FFF), composite-based additive manufacturing (CBAM), fused granular fabrication (FGF) or powder bed 3D printing process, and more preferably a SLS process is provided. As previously mentioned, the material according to the first aspect is particularly suitable to be processed via an additive manufacturing process and 3D objects may be obtained.

[Additive manufacturing (3D printing) process] In principle, the material according to the present invention may be used for various 3D printing processes to produce 3D thermoset objects. Depending on the 3D printing process, the material may be provided as a powder, a granulate, a filament or any other shape that is suitable for the respective process. However, according to a preferred embodiment, the material according to the first aspect of the present invention is provided for in powder or granular form or as a filament. Suitable 3D printing processes are for instance those as listed in the background part of this application and may be found in 3D printing handbooks and literature which are known to a person skilled in the art. Preferably, the material according to the present invention is used in SLS, FFF, CBAM, FGF, powder bed 3D printing processes and other processes similar to or derived from the before mentioned ones, most preferably, however, the material according to the first aspect of the present invention is used in an SLS processes.

[Post-curing step/process] Basically, any kind of treatment, in particular comprising a heat treatment step, that is capable to further cure, in particular fully cure, the partially cured, printed 3D objects, may be used, provided that such treatment is capable of curing the curing compound(s) that are provided for the post-curing step. A typical post-curing procedure, in case of an SLS process, is as follows: After the printing process, the objects are unpacked from the powder bed by hand, brushed and sandblasted. Afterwards, the objects are post-cured in a convection oven by using the following temperature program: 30 minutes at 80° C. (oven was pre-heated before), 15 minutes at 120° C. (heating rate 1° C./min) and further 15 minutes at 180° C. (heating rate 1° C./min). Then the fully cured 3D thermoset objects are slowly cooled to ambient temperature (25° C.).

Definitions

Any definition shall be analogously applied to any deduction of a defined term given hereunder within the present application, e.g. the definition of "curing" shall be analogously applied for terms such as "curable", "cured" and the like.

[Activation temperature] This term is understood to be the temperature at which there exists a sufficient number of molecules of a compound with translational energy equal to or greater than the activation energy, so that the intended chemical reaction of the compound can get started. For the present application, the activation temperature is defined as the onset of exothermic curing peak visible in a DSC measurement at a heating rate of 20° C./min as further described herein below.

[Curing] This term is to be understood as the formation of a thermoset from thermosetting components, in particular from a thermosetting material/resins by e.g. chemical cross-linking.

[Curing compound] This term is to be understood as a compound that reacts in any form with a thermosetting resin to form a thermoset by at least partially curing the resin. Exemplary examples of curing compounds are crosslinking compounds, catalysts, initiators, accelerators and mixtures thereof.

[Crosslinking compound] The term is to be understood as a curing compound that has on average at least two functional groups per molecule that are capable of forming chemical bonds, in particular covalent bonds, with a thermosetting resin.

[Resin] This term is to be understood as a monomer, polymer, oligomer, copolymer or mixture thereof. The terms monomer, polymer, oligomer, copolymer and resin are used synonymously within the present application unless stated otherwise. A resin may also be a mixture of different resins.

[Thermosetting resin] This term is to be understood as a resin comprising functional groups, such as hydroxyl, acid, amine, amide, epoxy, unsaturated bonds and the like, that may react with a curing compound or another thermosetting resin or any other compound comprising suitable functional groups to form a thermoset. The functionality of a thermosetting resin is on average at least greater than 1, preferably at least 2.

[Epoxy (resin)] This term is to be understood as a thermosetting resin comprising epoxy group(s).

[Polyester (resin)] This term is to be understood as a resin comprising at least two ester functionalities in its polymeric backbone.

[Elastomer] This term is to be understood as a polymeric material, which can be deformed elastically and whose Tg is below its application temperature, typically below 25° C. An elastomer is capable to be deformed upon application of pressure or tension but does, upon release of the applied external stress, return to its original shape.

[Polyether (resin)] This term is to be understood as a resin, typically an epoxy resin, having at least two ether functional groups within the backbone of the resin.

[Melt/melting] This term is to be understood as the transition from a solid state into a state that enables at least a certain flow, in particular viscous flow, of a compound/composition/material and is used synonymously for softening. Thus, this term shall in no way be limited to the strictly thermodynamic understanding of "melting" or a "melting point", meaning a sharp phase transition of a pure, crystalline compound from a crystalline, solid state, to a liquid state at a well-defined, sharp temperature, and also signifies the transition from a solid state to the rubbery state of non-crystalline or semi-crystalline compounds.

[Bonding] This term is to be understood as the application of shear forces to a material in powder or granular form that is heated to a temperature around (+/−20° C., preferably +/−10° C., more preferably +/−5° C.) the Tg of the material, e.g. by use of a standard bonding mixer (e.g. X-Bond bonding mixers available from Promixon, Italy or alternatively Exicom ET-125, SAE Stahl GmbH, Germany). Such bonding mixer is an apparatus that is capable of treating the material with both shear forces and heat energy. The heat, however, may exclusively be generated by the shear forces. Preferably, a rotational speed of 2500 to 3000 rounds per minute (rpm) of a blender blade is applied in the bonding process within a mixing device.

[wt %] If not stated otherwise within the present application, this term is to be understood to refer to the weight percentage of the specific compound with respect to the total material.

Further, it is noted that any embodiment may be combined with any other embodiment(s), irrespectively if these embodiments concern the same or different aspects of the subject matter provided within the present application. The same holds true for individual features of the respective embodiments.

Measurement Methods

If no measurement method is specified for a certain parameter/property, the measurement shall be performed according to the corresponding ISO standard for the measurement method of the respective parameter/property. If there is no ISO standard, the measurement shall be performed according to corresponding EN standard of the measurement method. If there is no EN standard, the measurement shall be performed according to the corresponding national DIN standard (Germany). If there is no national DIN standard, the measurement shall be performed according to the corresponding national ONORM standard (Austria). If there is also no ONORM standard, the measurement shall be performed by the method that is considered as most appropriate by the skilled person.

If not specified otherwise herein, the standard to be used for a certain measurement is the one that was published latest before the application date of the present application.

If a measurement method is given incorrectly or incompletely herein, it is to be replaced or completed by the corresponding standard in accordance with above ordering.

[Activation temperature] The activation temperature of the thermosetting resin with the curing compound is determined by preparing a well dispersed mixture (e.g. obtained from extrusion) of the thermosetting resin with the respective curing compound (=model material). The amount of curing compound is chosen such that the thermosetting resin can be fully cured by said curing compound. The mixture is then subjected to a DSC measurement (NETZSCH (Germany), DSC 204 F1 Phoenix, 10-15 mg sample weight, applying only heating cycle #1 according to Table 1a) with a heating rate of 20° C./min. The heat flow is plotted as a function of temperature up to 250° C. (in case the curing reaction occurs at higher temperature or the curing peak is cut off at 250° C., the measurement is performed again up to a higher temperature, e.g.: 300° C. or 350° C. with a fresh sample). The activation temperature is defined as the so-called onset temperature of the exothermic curing peak. The onset temperature is determined as the temperature at the point of intersection between the baseline of the respective exothermic curing peak and a tangent to the point of inflection of the increasing branch of the exothermic curing peak. This is further illustrated in FIG. 6. This procedure is repeated for each possible combination of one thermosetting resin and one curing compound. For a material comprising one thermosetting resin (R1) and two curing compounds (C1, C2), two model materials with compositions R1C1 and R1C2 need to be prepared and measured as described above to determine the activation temperatures. For a material comprising one thermosetting resin (R1) and three curing compounds (C1, C2, C3), the following model materials need to be prepared and measured: R1C1, R1C2, R1C3. In turn, for a material comprising two thermosetting resins (R1, R2) and two curing compounds (C1, C2), the following model materials need to be prepared and measured: R1C1, R1C2, R2C1, R2C2; and so forth.

By this method, suitable compounds to be employed as curing compound can be determined by the skilled person in case the temperature dependence of the reactivity of such compound with a respective thermosetting resin is unknown.

[peak temperature of the material] The peak temperature of an exothermic curing peak is determined by subjecting the material to a DSC measurement (NETZSCH (Germany), DSC 204 F1 Phoenix, 10-15 mg sample weight) with a heating rate of 20° C./min (applying only heating cycle #1 according to Table 1a). The heat flow is plotted as a function of temperature up to 250° C. (in case the curing reaction occurs at higher temperature or the curing peak is cut off at 250° C., the measurement is performed again up to a higher temperature, e.g.: 300° C. or 350° C. with a fresh sample). The peak temperature (maximum temperature of the peak) is then obtained by the analysis software of the device.

[peak temperature of model materials] The peak temperature of a model material is determined by preparing a well dispersed mixture (e.g. obtained from extrusion) of the thermosetting resin with the respective curing compound (=model material). The amount of curing compound is chosen such that the thermosetting resin can be fully cured by said curing compound. The mixture is then subjected to a DSC measurement (NETZSCH, DSC 204 F1 Phoenix, 10-15 mg sample weight) with a heating rate of 20° C./min (applying only heating cycle #1 according to Table 1a). The heat flow is plotted as a function of temperature up to 250° C. (in case the curing reaction occurs at higher temperature or the curing peak is cut off at 250° C., the measurement is performed again up to a higher temperature, e.g.: 300° C. or 350° C. with a fresh sample). The peak temperature (maximum temperature of the peak) is then obtained by the analysis software of the device. For a material comprising one thermosetting resin (R1) and two curing compounds (C1, C2), two model materials with compositions R1C1 and R1C2 need to be prepared and measured as described above to determine the peak temperatures. For a material comprising one thermosetting resin (R1) and three curing compounds (C1, C2, C3), the following model materials need to be prepared and measured: R1C1, R1C2, R1C3. In turn, for a material comprising two thermosetting resins (R1, R2) and two curing compounds (C1, C2), the following model materials need to be prepared and measured: R1C1, R1C2, R2C1, R2C2; and so forth.

[Epoxy equivalent weight (EEW)] The epoxy equivalent weight (EEW) is defined as the mass of a compound or a mixture of compounds that contains one (1) mol of epoxy groups. A high EEW means a low content of epoxy groups within the sample. The EEW is determined according to ISO 3001:1999.

[Weight average molecular weight (Mw)] The weight average molecular weight (Mw) is a statistic number relating to molecular weight distribution of a chemical sample, typically a resin as defined herein. Mw of compounds such as resins is determined by gel permeation chromatography (SECurity[2] GPC System, as available from PSS-Polymer (Germany)) against polyacrylate standards. For amorphous compounds, tetrahydrofurane (THF) is employed as eluent; for (semi)crystalline compounds, chloroform is employed as eluent.

[Reuse percentage (% re)] The reuse percentage (% re) is defined as the mass ratio of recycled material (e.g. from the powder bed or from overflow containers) to the total material composition (consisting of fresh and recycled material) to be used in a 3D printing process. For example, in case a material composition consists of 30% recycled material and 70% fresh material, the reuse percentage is calculated as follows: 30/(70+30)*100%=30% re.

[Glass transition temperature (Tg)] The glass transition temperature (Tg) is the gradual transition from an amorphous or (semi)crystalline material from a hard and brittle (glassy) state into a rubbery, entropy-elastic state. The glass transition temperature (Tg) of a compound/material is determined by differential scanning calorimetry (DSC) using a NETZSCH (Germany), DSC 204 F1 Phoenix device in accordance to ISO 11357-2:2014, with a heating/cooling rate of 20° C./min (10-15 mg sample weight). The Tg is determined by evaluating the point of inflection of the endothermal step (only endothermal steps above 0° C. are being considered). The samples were heated/cooled under nitrogen atmosphere. The following temperature program is used for the determination of the Tg (see Table 1a):

Only heating cycle #1 (steps #0 to #6) of the heating/cooling program is applied to determine the Tg of a fresh uncured material or an individual compound (e.g. a resin). Only heating cycle #1 is also applied to determine the Tg of an already partially or fully cured material.

The combination of heating cycles #1 & #2 (steps #0 to #10) of the heating/cooling program is applied as a quick test to determine the Tg of the cured material without performing the additive manufacturing and optional post-curing step (applicable for thermally curable materials only). The material is cured in the course of heating cycle #1 and the Tg of the cured material is then obtained from heating cycle #2. Heating cycle 3 (steps #11 to #13) may additionally be performed afterwards to confirm full curing of the sample.

TABLE 1a

Temperature program for DSC measurements

| Step # | Heating cycle # | Mode | Temperature [° C.] | Heating/cooling rate [K/min] | Time [hh:mm] |
|---|---|---|---|---|---|
| 0 | 1 | Start | 25 | | |
| 1 | | Dynamic | 80* | 20 | 00:03 |
| 2 | | Isotherm | 80* | | 00:01 |
| 3 | | Dynamic | −25 | 20 | 00:05 |
| 4 | | Isotherm | −25 | | 00:02 |
| 5 | | Dynamic | 250 | 20 | 00:14 |
| 6 | | Isotherm | 250 | | 00:20 |
| 7 | 2 | Dynamic | −25 | 20 | 00:14 |
| 8 | | Isotherm | −25 | | 00:02 |
| 9 | | Dynamic | 250 | 20 | 00:14 |
| 10 | | Isotherm | 250 | | 00:20 |

TABLE 1a-continued

Temperature program for DSC measurements

| Step # | Heating cycle # | Mode | Temperature [° C.] | Heating/cooling rate [K/min] | Time [hh:mm] |
|---|---|---|---|---|---|
| 11 | 3 | Dynamic | −25 | 20 | 00:14 |
| 12 | | Isotherm | −25 | | 00:02 |
| 13 | | Dynamic | 250 | 20 | 00:14 |

*If a curing compound already reacts significantly at a temperature of 80° C., then the sample is heated up to a lower temperature, e.g. 50° C. or 60° C. in steps #1 and #2 depending on the reactivity of the curing compound.

[Heat deflection temperature (HDT)] The heat deflection temperature, also known as heat distortion temperature, is the temperature at which a polymeric sample deforms under a specified flexural stress. The HDT is determined with a VIC-2450 machine from Zwick Roell (Germany) according to ISO 75-2:2013, wherein method A of said norm is employed and referred to exclusively herein. Said method employs a flexural stress of 1.80 MPa. So any reference to a HDT value is a reference to a HDT-A value.

[Mechanical properties] The mechanical properties (tensile modulus, stress at break and strain at break) of the 3D objects are measured according to DIN EN ISO 527-1:2019, on a Shimadzu AGS-X (Japan) universal testing machine equipped with a load cell of 10 kN. Tensile type 1A specimens were used and the clamping length was set to 115 mm. The crosshead speed is 5 mm/min for the determination of the tensile modulus, which is obtained by linear regression in the strain range between 0.1 and 0.25%. After reaching 0.25% strain, the crosshead speed is increased to 50 mm/min for the remainder of the test.

[Curing degree] The curing degree is defined as the value obtained by dividing the heat released upon reaction of the partially or fully cured material by the heat released upon reaction of the uncured material. The heat released upon reaction is obtained from DSC measurements (NETZSCH, DSC 204 F1 Phoenix, 10-15 mg per sample) of the respective material at a heating rate of 20° C./min by evaluating the area (in J/g) of the exothermic reaction peak. Of course, same amounts (by weight) of sample of the uncured and partially cured material have to be used. Only heating cycle #1 (Table 1a) is used for the respective measurement. A partially cured material or 3D thermoset object is defined as having a curing degree of between 0.0001 (0.01%) and 0.9 (90%), whereas a fully cured material or 3D thermoset object is defined as having a curing degree of above 0.9 (90%).

Alternatively, full curing of a sample can be determined by running two consecutive DSC measurements (NETZSCH, DSC 204 F1 Phoenix, 10-15 mg per sample, 20° C./min heating/cooling rate, 25° C. to 250° C.) and observing the shift in Tg. As defined herein, the Tg of a fully cured sample will not significantly shift in two consecutive DSC measurements ($|\Delta Tg| < 2°$ C.). The combination of heating cycle #1 and #2 of the heating/cooling program (see Table 1a) is applied to confirm full curing of the material; for this purpose, the glass transition temperatures of the cured material as determined by the first and second heating cycle are compared. In case $|\Delta Tg| < 2°$ C., the tested material is considered as fully cured.

[Viscosity]

Material: The viscosity, in particular the minimum viscosity, of the material is measured by using a parallel plate rheometer AR2000ex by TA Instruments (US). For the sample preparation 1.1 g of the material is pressed into a tablet (diameter=25 mm, height=approximately 1.8 mm) at a pressure of 10 bar by using a manual hydraulic press (Mauthe Maschinenbau, Germany). The tablet is clamped between the two plates of the parallel plate rheometer, the chamber of the rheometer is closed and the measurement is started with the following heating program and parameters:

20 to 40° C. at a heating rate of 5° C./min 40 to 60° C. at a heating rate of 10° C./min 60 to 150° C. at a heating rate of 5° C./min.

the sample is kept at 150° C. for the rest of the measurement (typically 50 minutes in total)

frequency: 1 Hz amplitude: 0.05%

The storage modulus (G'), the loss modulus (G"), the complex shear modulus (G*) and the complex shear viscosity ($\eta$*) are determined. The absolute value of the complex shear viscosity ($|\eta$*$|$) is denoted as the viscosity of the material in Pa*s herein and is provided by the analysis software of the rheometer. Supplementary ISO 6721-10: 2015 is being employed. Also, the minimum viscosity (=minimum of the absolute value of the complex shear viscosity=min($|\eta$*$|$)) may thus be determined by the analysis software of the rheometer.

Resins (e.g.: polyester, epoxy)/other compounds: The dynamic viscosity of resins is determined by using a cone-plate viscometer device (Brookfield CAP 2000+ by Brookfield Ametek, US) equipped with spindle 06 (CAP-S-06); depending on the expected dynamic viscosity of the sample, also other spindles might be appropriate (e.g. spindle 02 for dynamic viscosities of below 0.5 Pas at 150° C.). The plate is pre-heated to 150° C. and an appropriate amount of sample (typically about 0.1 g for solid compounds and spindle 06) is applied onto the plate. The sample is heated to 150° C. and the measurement is started by applying a rotational speed of 700 rounds per minute (rpm) for a time period of 115 seconds. The dynamic viscosity at a temperature of 150° C. is then obtained from the display of the device. Supplementary information can be found in the user manual of the device (Manual No. M02-313-I091699 as available from: https://www.brookfieldengineering.com/-/media/ametekbrookfield/manuals/lab%20viscometers/cap2000%20instructions.pdf?la=en [retrieved on 06.05.2021]) (e.g.: appropriate choice of spindle, guideline for the appropriate amount of sample, etc.).

[Softening Point] The softening point is determined according to DIN ISO 51920:2012.

[Gel time] The gel time is a measure of the reactivity of a thermosetting material at a given temperature. The shorter the gel time, the faster the curing reaction occurred at the given temperature. The gel time is measured at 150° C. using a Gelnorm Heating System (Gel Instrument AG, Switzerland) with a temperature controller TC-4 (50 to up to 200° C.). The gel time is measured in accordance to ISO 8130-6:2011.

EXAMPLES

Inventive Example 1

Figure 1:
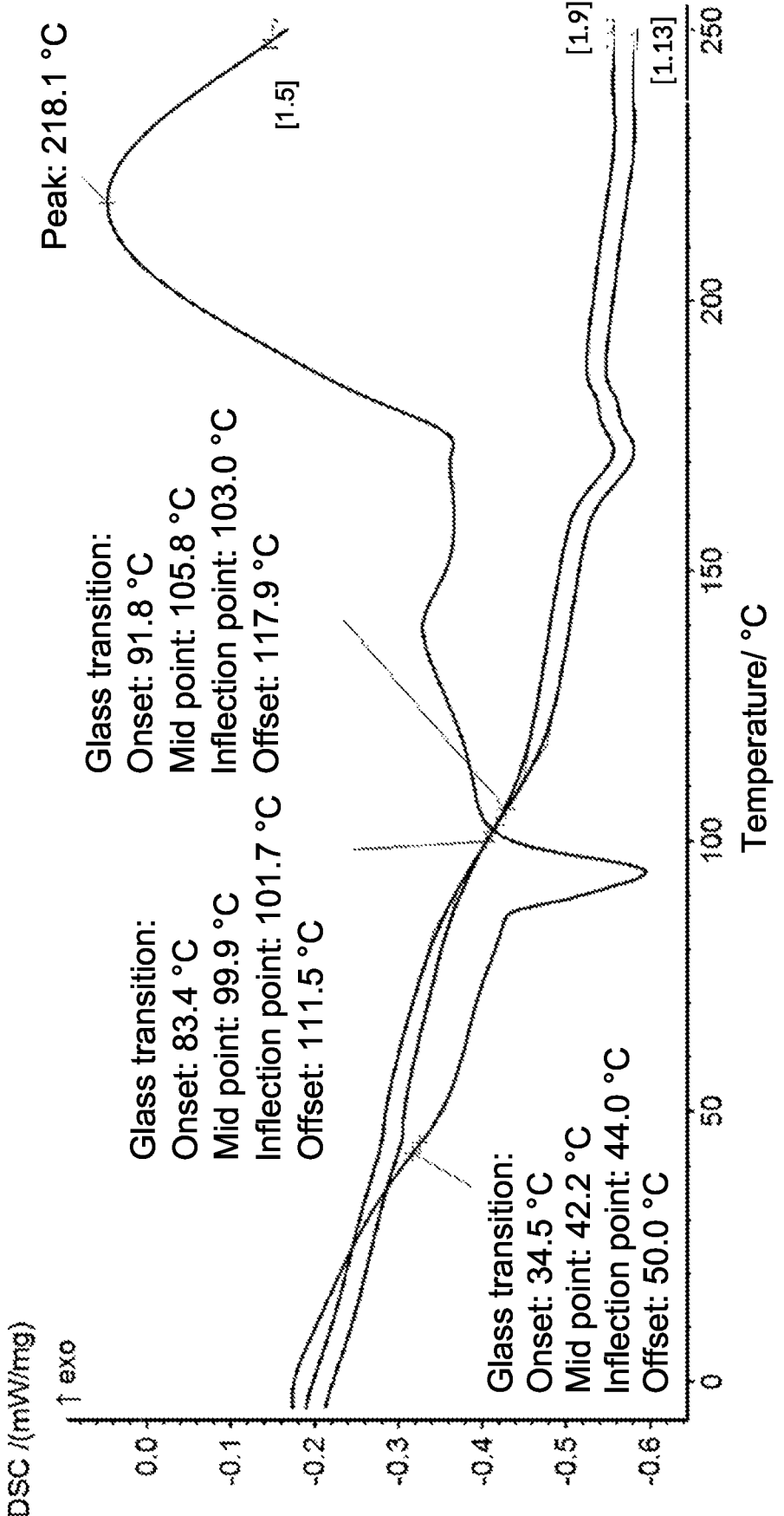
FIG. 1 shows typical DSC curves of a material according to the present invention. In the first run (grey line), the curing can clearly be observed by the presence of the exothermic reaction starting at above 100° C., which is attributed to a curing reaction caused by the curing compound that is provided for the additive manufacturing process; the peak of this first curing reaction is at about 140° C. The exact peak temperature could be obtained by the analysis software. The start of the second curing reaction, which is caused by the curing compound, that is provided for the post-curing step, is at above 170° C. The maximum reaction rate and thus the maximum formation of exothermic reaction heat is reached at the peak temperature of 218° C. At such temperature, the object/material can be fully cured in the course of a post-curing step. In the second and third DSC-run (black lines), no further exothermic reaction is observed, indicating that the material is fully cured. The endothermic peak slightly below 100° C. indicates a melting of a (semi) crystalline compound of the material. The Tg of this material is 44° C.
Figure 2:
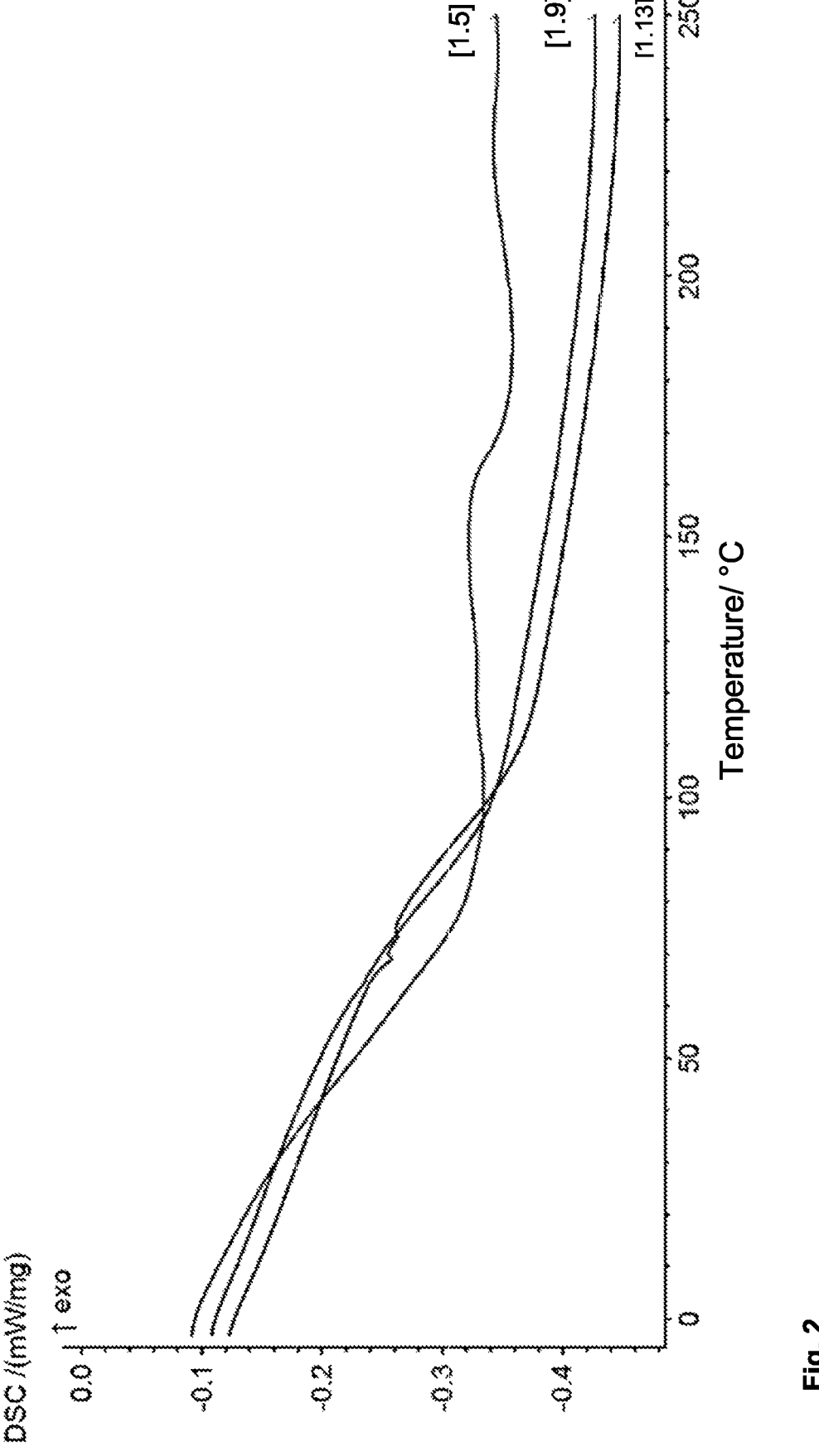
FIG. 2 presents DSC curves of a material with only one curing compound, which is reactive at about 100° C. and above, that is provided for curing during the additive manufacturing process. Such material is significantly more sensitive towards undesired pre-reactions during storage or transport because of the high reactivity and high content of the curing compound as compared to an inventive material. Also, such a material usually cannot be reused and suffers strong thermal bleeding.
Figure 3:
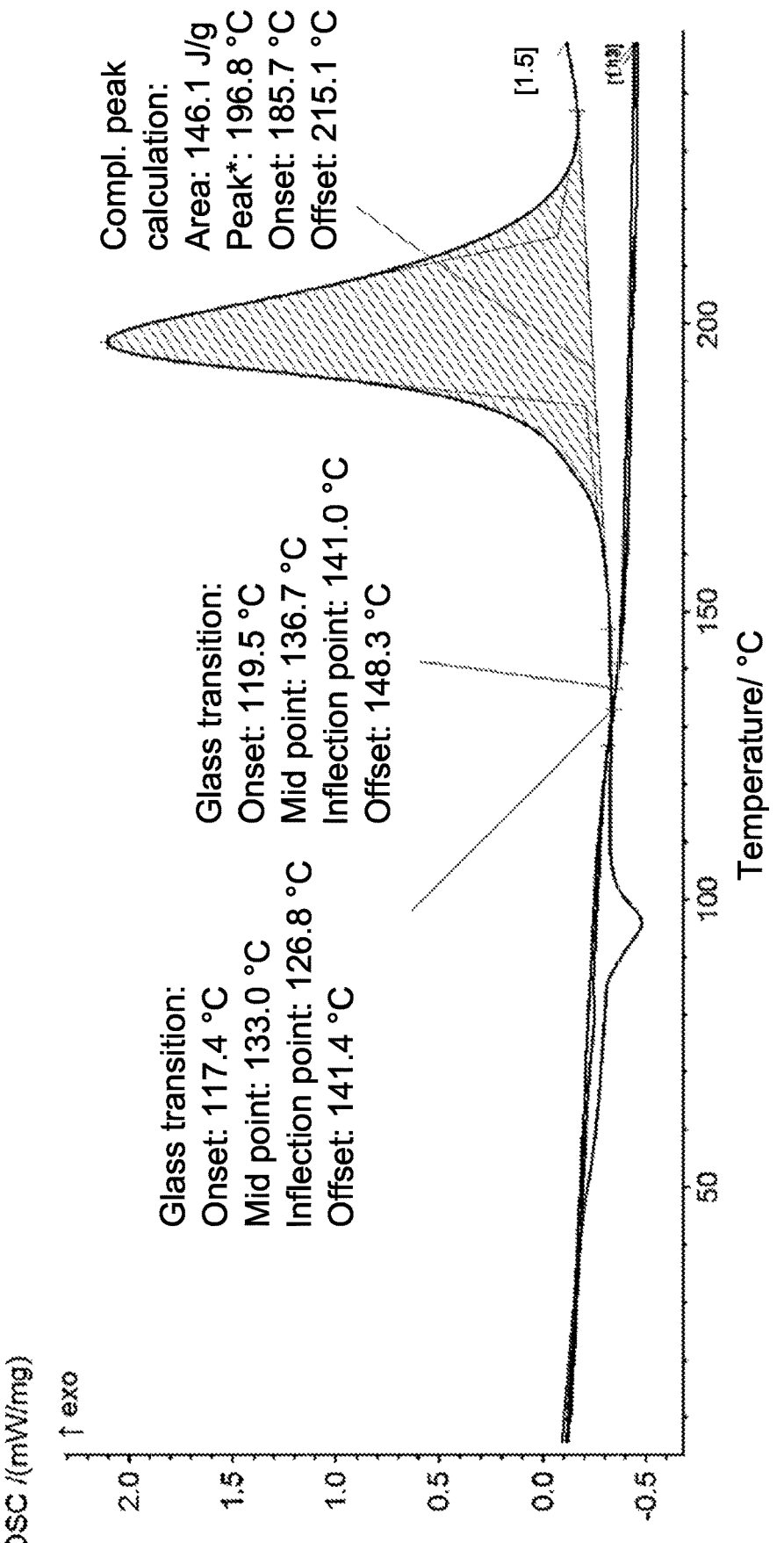
FIG. 3 shows DSC curves of a material that only contains one curing compound, which is reactive at about 160° C. and above, that is provided for curing during the post-curing step. The activation temperature (onset temperature) is higher than 160° C. in this case, namely 186° C. The peak temperature is 197° C. Such material does not show any or only insignificant curing during the additive manufacturing step (the energy of such process is chosen such that only a more reactive curing compound that is provided for the additive manufacturing step reacts to a significant extent; e.g.: a compound as used in FIG. 2) and thus may not be removed from the printer without being damaged or may not even be dimensionally stable in the course of the post-curing step.
Figure 4:
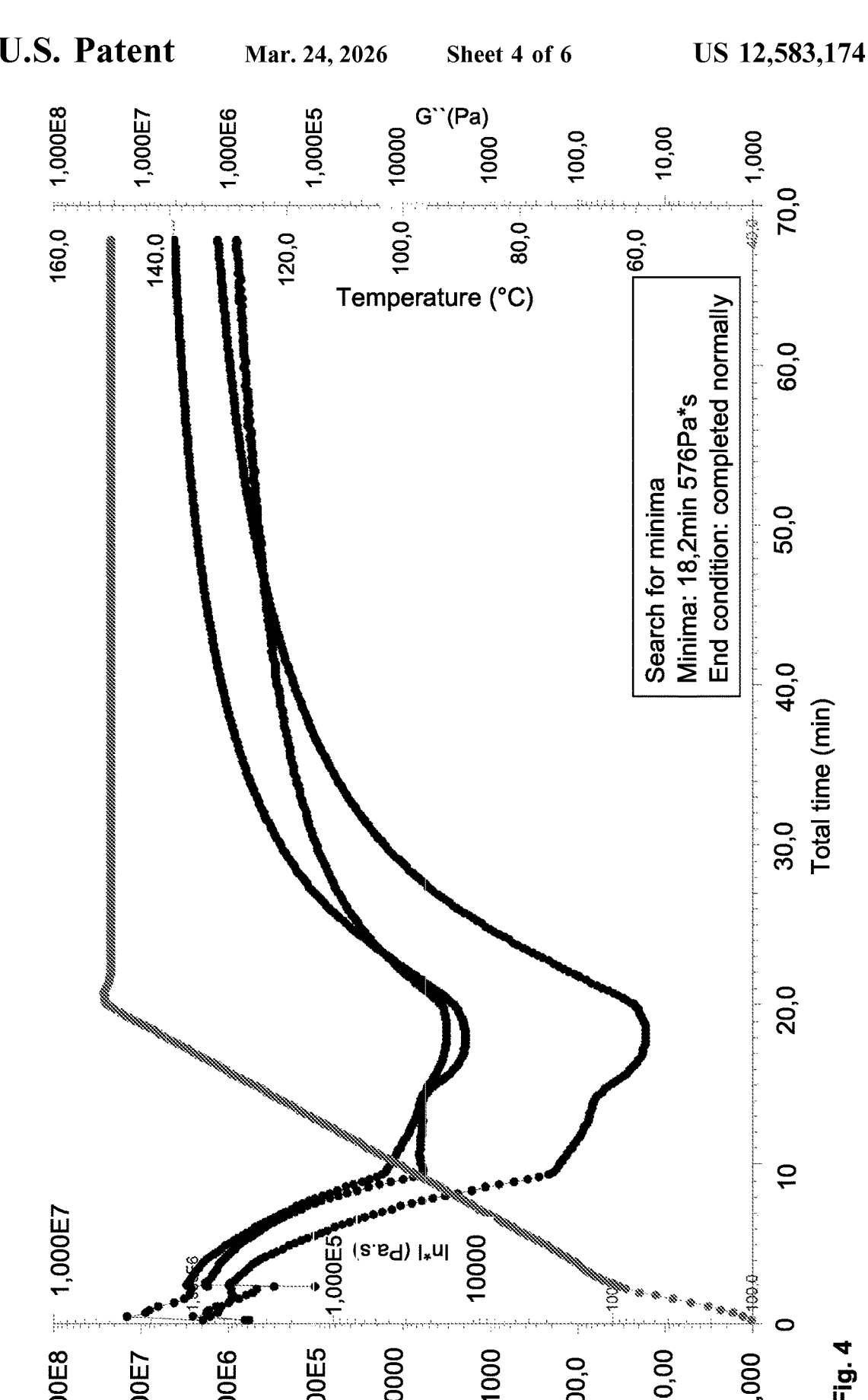
FIG. 4 shows typical graphs obtained from the viscosity measurement of a thermosetting material according to the present invention. The black line with the lowest minimum shows the viscosity ($|\eta$*$|$). The temperature increase is shown by the grey line. As can be seen, the viscosity first decreases, reaches the minimum and then starts to increase as a result of the curing of the material. It can be clearly seen, that the minimum of the viscosity curve is formed by an overlap of two distinct reactions, which are caused by two curing compounds, one of which is provided for the additive manufacturing process and the other one for the post-curing step. The reaction of the curing compound provided for the additive manufacturing process occurs already at lower temperature and decreases the negative slope of the viscosity curve. Such reaction provides dimensional stability to an object during the additive manufacturing process. Nevertheless, the viscosity still slowly decreases to reach a minimum due to softening and/or melting of the compounds of the material upon further heating. The following rapid increase of viscosity reflects the further crosslinking. Also, from FIG. 4. it can be seen, that the material still possesses good flowability, even if the first curing compound as provided for the additive manufacturing process already reacted to a large extent. This flowability enables sufficient flow of the material in the course of the post-curing step, which results in better layer coalescence and thus in improved isotropy of the obtained objects, however, without loss of shape or dimensional accuracy due to the partial curing of the more reactive curing compound.
Figure 5:
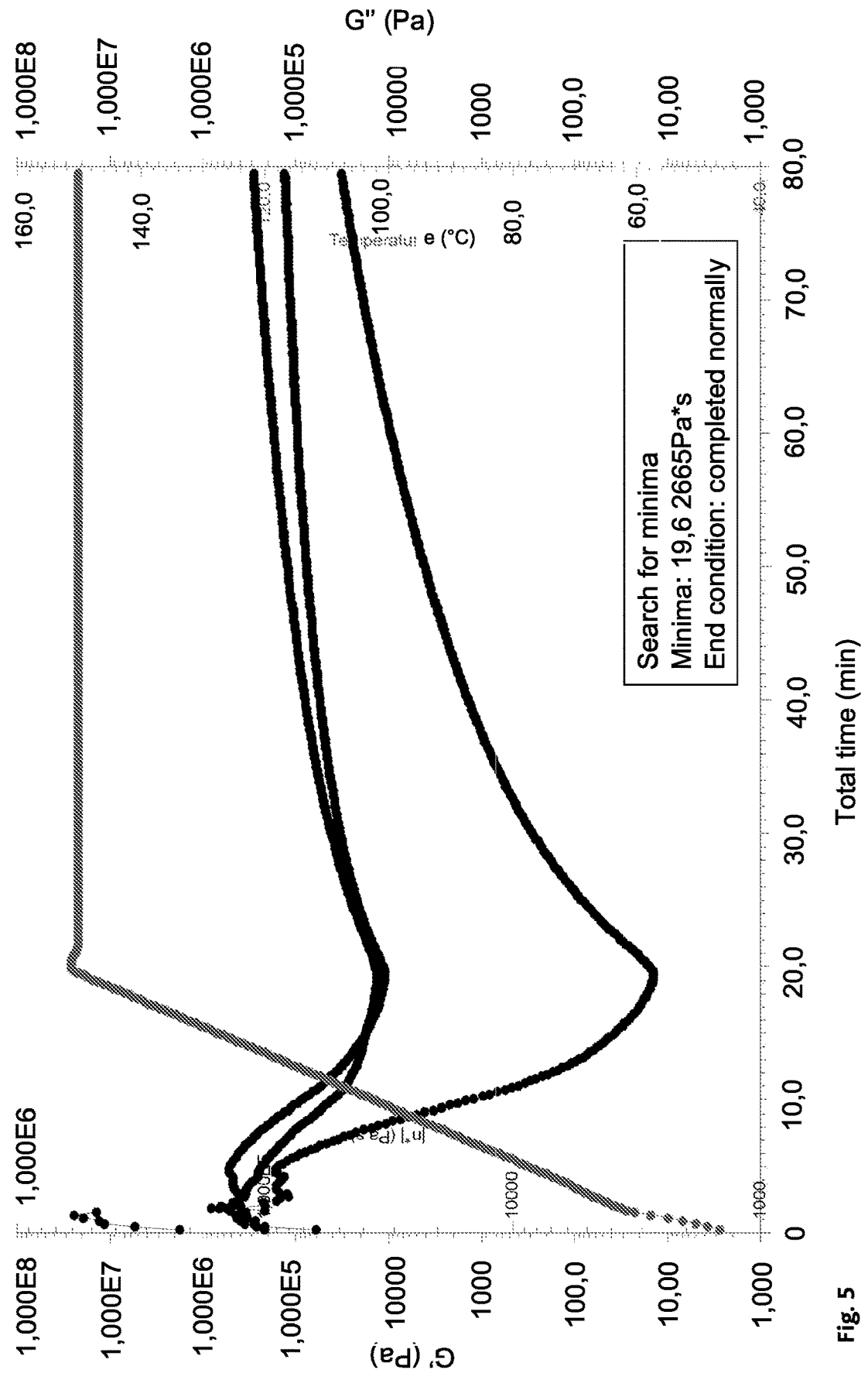
FIG. 5 shows typical graphs obtained from the viscosity ($|\eta$*$|$) measurement of a thermosetting material comprising only one curing compound. It can be seen that only one kind of curing reaction occurs. Since only one curing compound is used which has a reactivity starting at 80° C., it is difficult to control the reactivity of the material, upon storage and also in the course of the additive manufacturing process, resulting in undesired pre-reactions of the material upon storage and of excess material during the additive manufacturing process. The material reacts much faster with increasing temperature than the material according to the present invention, resulting in a higher minimum viscosity, causing deteriorated layer coalescence and thus anisotropic properties of the objects. Also, the excess material may not be reused.
Figure 6:
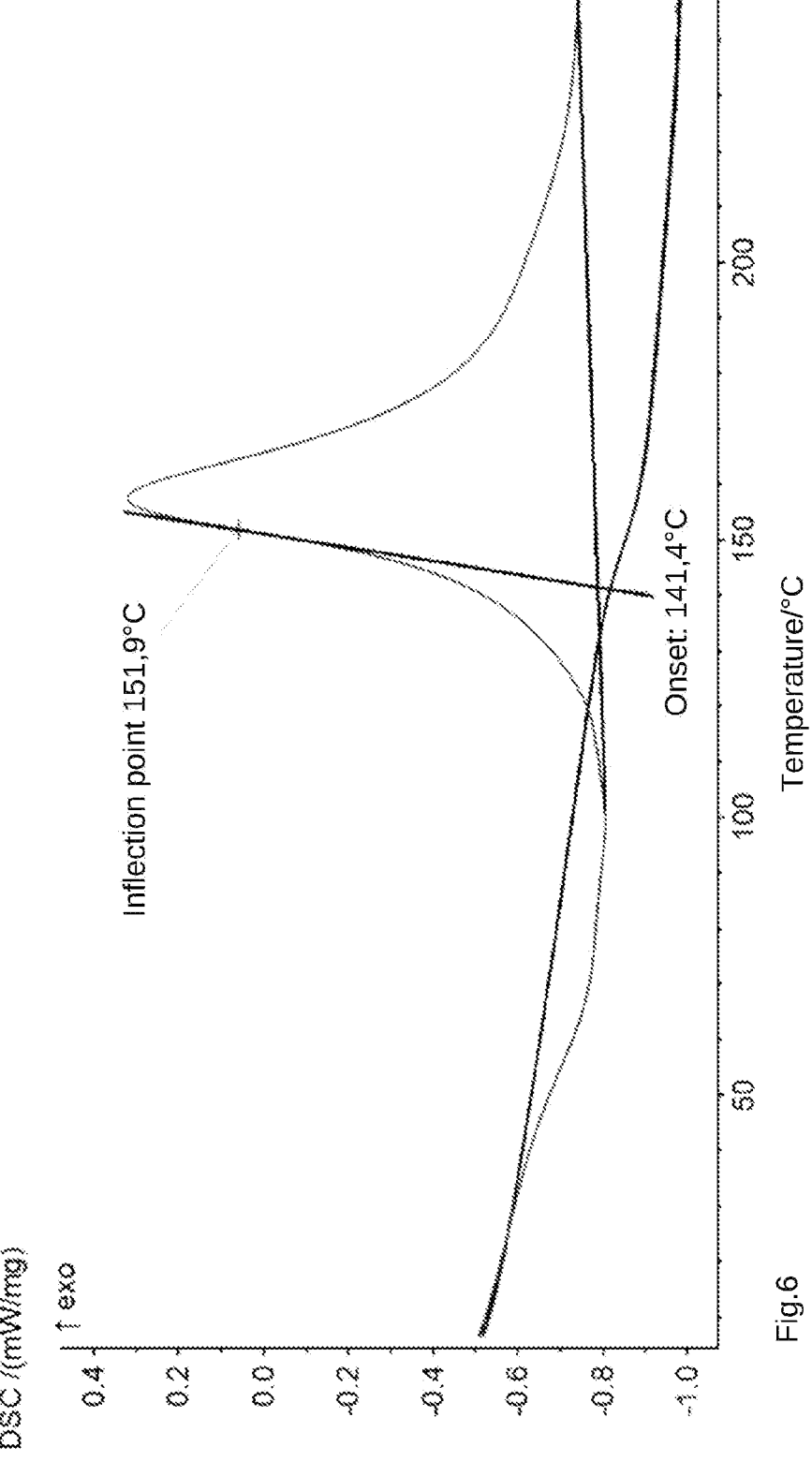
FIG. 6 shows an illustrative example for the determination of the activation temperature of a thermosetting resin with a curing compound by means of a DSC measurement According to the definition and method given within the present application, the activation temperature, corresponds to the onset point of the exothermic curing peak, being 141° C.

The material was composed of D.E.R. 642U (Epoxy Resin; 50.0 wt %, EEW=500-560 q/eq; viscosity=1.9-3.3 Pas (150° C.), softening point=89-97° C., Dow Chemical Company, US), Epiclon HP-4710 (naphtalene based epoxy resin, 6.0 wt %, softening point=96° C., EEW=171 g/eq, viscosity=1.0 Pas (150° C.), DIC Corp., Japan); Sirales PE 5900 ((semi)crystalline, carboxy functional polyester, 8% wt %, AV=28-36 mgKOH/g, viscosity=1.3 Pas (150° C.), Mp=110° C., melting range of 105-120° C., Sir Industriale); Kukdo KR-102 (rubber modified Bisphenol-A-type epoxy resin; 10.0 wt %, EEW=1100-1300, Kukdo Chemical Co, Ltd., South Korea); Aradur 835 CH (aliphatic polyamine curing compound, 2.0 wt %, reactive at >70° C. Huntsman, US); CUREZOL 2MZ (imidazole curing compound, 1.0 wt %, reactive at >100° C., SHIKOKU); DYHARD® 100S (Dicyandiamide curing compound, 1.5 wt %, reactive at >150° C. Alz Chem, Germany); Aktifit AM (filler, 10.0 wt %, Hoffmann Mineral GmbH, Germany), Benzoin=Hydroxybenzylphenyl-Ketone (degassing additive, 1.0 wt %, Harke Chemicals GmbH, Germany); Resiflow PL200 (flow additive, 2.5 wt %, Estron Chemical Inc., US), TI-Select TS6200 (pigment additive, 8 wt %, DuPont Titanium Technologies, US). The total quantities of each compound were chosen such that 40 kg of powder was obtained. All compounds were premixed in a high-speed mixer (Thermo PRISM Pilot 3, Thermo Fisher Scientific, US) for 1 min at 25° C. with a rotor speed of 1000 rpm and then extruded in a twin-screw ZSK-18 extruder (Coperion, Germany) at a screw speed of 400 rpm with a temperature gradient from 40 to 100° C. and a cooling device for the feeding area was used. The mixture obtained was then cooled down, granulated and fine ground to obtain a powder material having a D50 of less than 80 μm. The Tg of the material was 60° C.

Inventive Example 2

D.E.R.™ 6510-HT (epoxy resin, 41.5 wt %, EEW=400-450 q/eq, viscosity=7.5-9.5 Pas (150° C.), softening point=105-114° C.), Dow Chemical Company); Epiclon® HP-4710 (naphtalene based epoxy resin, 12.0 wt %, softening point=96° C., EEW=171 g/eq, viscosity=1.0 Pas (150° C.), DIC Corp.); HyPox® RK84L (CTBN-modified epoxy resin, 10.0 wt %, softening point is not measurable, EEW=1250-1500 g/eq, viscosity=300-500 Pas (100° C.), Huntsman), Aradur 835 CH (aliphatic polyamine curing compound; 1.5 wt %, reactive at >70° C., Huntsman), CUREZOL 2MZ (imidazole curing compound, 1.0 wt %, reactive at >100° C. SHIKOKU); DYHARD® 100S (Dicyandiamide curing compound, 0.5 wt %, reactive at >150° C. Alz Chem); Aktifit AM (filler, 9 wt %, Hoffmann Mineral GmbH), Benzoin (Hydroxybenzylphenyl-Ketone degassing additive, 0.5 wt %, Harke Chemicals GmbH); Resiflow PL200 (flow additive, 2.0 wt %, Estron Chemical Inc.); TI-Select TS6200 (pigment filler, 10 wt %, DuPont Titanium Technologies), Exolit® OP1230 (organic phosphinate flame retardant filler, 12 wt %, Clariant Ltd., Switzerland). The material was produced in full analogy to Example 1. The Tg of the material was 63° C.

Inventive Example 3

D.E.R.™ 6510-HT (epoxy resin, 41.5 wt %, EEW=400-450 q/eq, viscosity=7.5-9.5 Pas (150° C.), softening point=105-114° C.), Dow Chemical Company); Epiclon® HP-4710 (naphtalene based epoxy resin, 12.0 wt %, softening point=96° C., EEW=171 g/eq, viscosity=1.0 Pas (150° C.), DIC Corp.); HyPox® RK84L (CTBN-modified epoxy resin, 10.0 wt %, softening point is not measurable, EEW=1250-1500 g/eq, viscosity=300-500 Pas (100° C.), Huntsman), Aradur 835 CH (aliphatic polyamine curing compound; 1.5 wt %, reactive at >70° C., Huntsman), Epikure P-108 (accelerated dicyandiamide curing agent, 1.5 wt %, Hexion Chemicals, US); Aktifit AM (filler, 9 wt %, Hoffmann Mineral GmbH), Benzoin (Hydroxybenzylphenyl-Ketone degassing additive, 0.5 wt %, Harke Chemicals GmbH); Resiflow PL200 (flow additive, 2.0 wt %, Estron Chemical Inc.); TI-Select TS6200 (pigment filler, 10 wt %, DuPont Titanium Technologies), Exolit® OP1230 (organic phosphinate flame retardant filler, 12 wt %, Clariant Ltd.). The material was produced in full analogy to Example 1. The Tg of the material was 65° C.

Inventive Example 4

D.E.R.™ 6510-HT (epoxy resin, 41.5 wt %, EEW=400-450 q/eq, viscosity=7.5-9.5 Pas (150° C.), softening point=105-114° C.), Dow Chemical Company); Epiclon® HP-4710 (naphtalene based epoxy resin, 12.0 wt %, softening point=96° C., EEW=171 g/eq, viscosity=1.0 Pas (150° C.), DIC Corp.); HyPox® RK84L (CTBN-modified epoxy resin, 10.0 wt %, softening point is not measurable, EEW=1250-1500 g/eq, viscosity=300-500 Pas (100° C.), Huntsman), Aradur 835 CH (aliphatic polyamine curing compound; 1.5 wt %, reactive at >70° C., Huntsman), DYHARD® MI-C(imidazole curing compound, 0.5 wt %, reactive at >120° C. AlzChem, Germany); DYHARD® 100S (Dicyandiamide curing compound, 1.0 wt %, reactive at >150° C. Alz Chem); Aktifit AM (filler, 9 wt %, Hoffmann Mineral GmbH), Benzoin (Hydroxybenzylphenyl-Ketone degassing additive, 0.5 wt %, Harke Chemicals GmbH); Resiflow PL200 (flow additive, 2.0 wt %, Estron Chemical Inc.); TI-Select TS6200 (pigment filler, 10 wt %, DuPont Titanium Technologies), Exolit® OP1230 (organic phosphinate flame retardant filler, 12 wt %, Clariant Ltd.). The material was produced in full analogy to Example 1. The Tg of the material was 64° C.

Inventive Example 5

D.E.R. 642U (Epoxy Resin; 50.0 wt %, EEW=500-560 q/eq; viscosity=1.9-3.3 Pas (150° C.), softening point=89-97° C., Dow Chemical Company), Epiclon HP-4710 (naphthalene based epoxy resin, 6.0 wt %, softening point=96° C., EEW=171 g/eq, viscosity=1.0 Pas (150° C.), DIC Corp.); Sirales PE 5900 ((semi)crystalline, carboxy functional polyester, 8% wt %, AV=28-36 mgKOH/g, viscosity=1.3 Pas (150° C.), Mp=110° C., melting range of 105-120° C., Sir Industriale, Italy); Kukdo KR-102 (rubber modified Bisphenol-A-type epoxy resin; 10.0 wt %, EEW=1100-1300, Kukdo Chemical Co, Ltd.); Aradur 835 CH (aliphatic polyamine curing compound, 3.0 wt %, reactive at >70° C. Huntsman); DYHARD® 100S (Dicyandiamide curing compound, 1.5 wt %, reactive at >150° C. AlzChem); Aktifit AM (filler, 10.0 wt. %, Hoffmann Mineral GmbH), Benzoin=Hydroxybenzylphenyl-Ketone (degassing additive, 1.0 wt %, Harke Chemicals GmbH); Resiflow PL200 (flow additive, 2.5 wt %, Estron Chemical Inc.), TI-Select TS6200 (pigment additive, 8 wt %, DuPont Titanium Technologies). The material was produced in full analogy to Example 1. The Tg of the material was 64° C.

Inventive Example 6

D.E.R.™ 6510-HT (epoxy resin, 32.0 wt %, EEW=400-450 q/eq, viscosity=7.5-9.5 Pas (150° C.), softening point=105-114° C.), Dow Chemical Company); Crylcoat® 1514-2 (carboxylated polyester resin, 32.0 wt %, Tg=55° C., Acid Value=68-74 mg KOH/g, viscosity=7.5-11 Pas (175° C.), Annex, Austria); Aradur 835 CH (aliphatic polyamine curing compound; 1.5 wt %, reactive at >70° C., Huntsman), DYHARD® 100S (Dicyandiamide curing compound, 1.0 wt %, reactive at >150° C. Alz Chem); Aktifit AM (filler, 9 wt %, Hoffmann Mineral GmbH), Benzoin (Hydroxybenzylphenyl-Ketone degassing additive, 0.5 wt %, Harke Chemicals GmbH); Resiflow PL200 (flow additive, 2.0 wt %, Estron Chemical Inc.); TI-Select TS6200 (pigment filler, 10 wt %, DuPont Titanium Technologies), Exolit® OP1230 (organic phosphinate flame retardant filler, 12 wt %, Clariant Ltd.). The material was produced in full analogy to Example 1. The Tg of the material was 59° C.

Comparative Example 1

D.E.R 642U (Epoxy Resin; 48.0 wt %, EEW=500-560 q/eq; viscosity=1.9-3.3 Pas (150° C.), softening point=89-97° C., Dow Chemical Company); Epiclon® HP-4710 (naphtalene based epoxy resin, 12.0 wt %, softening point=96° C., EEW=171 g/eq, viscosity=1.0 Pas (150° C.), DIC Corp.); HyPox® RK84L (CTBN-modified epoxy resin, 10.0 wt %, softening point is not measurable, EEW=1250-1500 g/eq, viscosity=300-500 Pas (100° C.), Huntsman); 2-Ethylimidazole (curing compound, 0.5 wt %, reactive at >100° C. Donauchem GmbH); Epikure P-108 (accelerated Dicyandiamide curing compound, 1 wt %, reactive at >100° C. Hexion Chemicals); Lanco TF 1778 (additive, 0.5 wt %, Lubizol); Ti-select (pigment additive, 13.0 wt %, DuPont); Tremin VP 939-600 EST (wollastonite filler, 15 wt %, HPF, Quarzwerke, Germany). The material was produced in full analogy to Example 1. The Tg of the material was 53° C.
Printing Tests In order to assess the suitability of the material, according to the present invention to be used in an additive manufacturing process, 3D printing tests were performed. An SLS 3D printing process was chosen, as the materials according to the present invention are particularly suitable to be provided in powder form. However, the materials according to the present invention may also be used for various 3D printing processes other than SLS.

[SLS printing process] A PRODWAYS ProMaker P1000 SLS 3D Printer (Prodways, France) was used for all the SLS 3D printing tests. Tensile bars according to DIN EN ISO 527-1:2019 were printed. The parameter settings of the SLS 3D printer are listed in Table 1.

TABLE 1

| SLS 3D printer parameter settings for the printing tests | | | | | |
|---|---|---|---|---|---|
| laser power [W] | hatch distance [mm] | scan speed [mm/sec] | layer thickness [mm] | powder bed temperature [° C.] | feeder temperature [° C.] |
| 16 | 0.16 | 3500 | 0.10 | 65 | 50 |

After the 3D printing process, the objects (partially cured 3D thermoset objects) were unpacked from the powder bed by hand and sandblasted by using a Guyson Formula 1200 blast cabinet (Guyson Corp., US).
[Post-Curing]

The printed objects were post-cured in a convection oven (Thermo Fisher Scientific (US), Heraeus OVEN 199L) using the following temperature program: start at 25° C.—the printed object is put in the oven; heating 1° C./min; holding for 30 minutes at 100° C.; heating: 1° C./min; holding 15 minutes at 150° C.; heating 1° C./min and further holding 15 minutes at 200° C. Then the post-cured objects (fully cured 3D thermoset objects) were cooled to ambient temperature (25° C.). Finally, full curing of the 3D thermoset objects was confirmed by DSC (the shift in Tg was below 0.5° C. in two consecutive DSC measurements according to the method as described above).
[Gel Time Measurements]

Material of inventive example 1 and comparative example 1 were stored for 8 hours at 65° C. in an oven and the gel time of the materials were measured at 150° C. before and after storage. The results are shown in Table 2.

TABLE 2

| Gel time measurement results of thermally treated materials | | |
|---|---|---|
| | Inventive Example 1 | Comparative example 1 |
| Gel time before storage at 65° C. | 215 s at 150° C. | 194 s at 150° C. |
| Gel time after 8 hours of storage at 65° C. | 195 s at 150° C. | 20 s at 150° C. |

The gel time of the material of inventive example 1 exhibits higher storage stability at 65° C. compared to the material of comparative example 1 as indicated by the difference in gel time reduction. A reduction of gel time indicates pre-reactions (curing) of the material.

This measurement simulates the temperature treatment of the material in the powder bed of a SLS printer and the results clearly show that the reusability of non-printed material (=e.g. excess material of the powder bed or from the overflow containers) is largely improved by the present invention.

To further determine the storage stability of the materials, samples were stored at 25° C. over 5 days and their gel times were determined at 150° C. before and after storage. The material of inventive example 1 shows no significant change in gel time after 5 days and the deviation is within the measurement error range of ±3 seconds. The gel time of the material of comparative example 1 shows a significant decrease of above 50 seconds within 5 days. The material according to the invention significantly increases the storage stability of the thermosetting materials. The results of the gel time measurements are listed in Table 3.

TABLE 3

| Storage stability of inventive example 1 and comparative example 1 at 25° C. | | |
|---|---|---|
| Storage time at 25° C. | Inventive Example 1 | Comparative Example 1 |
| Before storage | 215 s at 150° C. | 200 s at 150° C. |
| 1 day | 215 s at 150° C. | 194 s at 150° C. |
| 2 days | 213 s at 150° C. | 189 s at 150° C. |
| 3 days | 214 s at 150° C. | 169 s at 150° C. |
| 4 days | 215 s at 150° C. | 150 s at 150° C. |
| 5 days | 214 s at 150° C. | 142 s at 150° C. |

Characterization of the Fully Cured 3D Thermoset Objects

[Mechanical properties] The mechanical characterization of the printed and fully post-cured objects was carried out using a commercially available tensile test (DIN EN ISO 527-1:2019) facility (Shimadzu AGS-10kNXD series). A clamping length of 115 mm and a crosshead speed of 5 mm/min were applied. The following Table 4 shows the determined mechanical properties of fully cured tensile bars. Based on the tensile test, the tensile modulus, stress at break and the strain at break were determined according to DIN EN ISO 527-1: 2019.

TABLE 4

| Mechanical properties of the fully cured tensile bars | | | |
|---|---|---|---|
| | Tensile modulus [GPa] | Stress at break [MPa] | Strain at break [%] |
| Example 1 | 2.6 | 48.7 | 2.7 |
| Example 2 | 2.5 | 46.0 | 2.4 |
| Comparative Example 1 | 3.0 | 34.9 | 1.3 |

The invention claimed is:

1. A method of producing a cured 3D thermoset object comprising at least the following steps:

a. Subjecting a thermoseiling material to an additive manufacturing process;

b. obtaining a partially cured 3D thermoset object and;

c. subjecting the partially cured 3D thermoset object to a post curing process to further cure the 3D thermoset object, wherein the thermosetting material comprises at least one thermosetting resin and at least two curing compounds different from said thermosetting resin able to cure this/these thermosetting resin(s), wherein at least one curing compound is provided for curing during the additive manufacturing process and another at least one curing compound is provided for curing during the post-curing process, wherein the thermosetting material uses a purely thermal curing system, and wherein at the least one curing compound has an activation temperature of between 70° C. and 130° C. and another of the at least one curing compound has an activation temperature of greater than 130° C. with the activation temperature being determined by means of DSC analysis with a heating/cooling rate of 20° C./min.

2. The method according to claim 1, characterized in that the post-curing process comprises a heat treatment.

3. The method according to claim 1, characterized in that the thermosetting material comprises at least two thermosetting resins.

4. The method according to claim 1, characterized in that the at least one curing compound provided for curing during the additive manufacturing process is present in the material in a sub-stoichiometric amount with regard to the reactive groups present in the thermosetting material.

5. The method according to claim 1, characterized in that the or at least one of the curing compound(s) provided for curing during the post-curing process has an activation temperature above the temperature used in the additive manufacturing process, as determined by means of DSC with a heating/cooling rate of 20° C./min.

6. The method according to claim 1, characterized in that the difference regarding activation temperature of at least two curing compounds is at least 10° C. with the activation temperature being determined by means of DSC analysis with a heating/cooling rate of 20° C./min.

7. The method according to claim 1, characterized in that the difference regarding activation temperature of at least two curing compounds is at least 20° C. with the activation temperature being determined by means of DSC analysis with a heating/cooling rate of 20° C./min.

8. The method according to claim 1, characterized in that the thermosetting material comprises at least a third curing compound having a temperature difference regarding activation temperature from the first curing compound of at least 20° C. with the activation temperature being determined by means of DSC analysis with a heating/cooling rate of 20° C./min.

9. The method according to claim 1, characterized in that the thermosetting material comprises at least a third curing compound having a temperature difference regarding activation temperature from the first curing compound of at least 40° C. with the activation temperature being determined by means of DSC with a heating/cooling rate of 20° C./min.

10. The method according to claim 1, characterized in that the thermosetting material comprises at least a third curing compound having a temperature difference regarding activation temperature from the first curing compound of at least 60° C. with the activation temperature being determined by means of DSC analysis with a heating/cooling rate of 20° C./min.

11. The method according to claim 1, characterized in that the thermosetting material comprises at least three curing compounds.

12. The method according to claim 1, characterized in that the thermosetting material is present in form of powder, granulate and/or filament.

* * * * *